United States Patent
Wloczysiak et al.

(10) Patent No.: US 10,623,337 B2
(45) Date of Patent: Apr. 14, 2020

(54) DIVERSITY RECEIVER CONFIGURATIONS WITHOUT CASCADED FILTERS

(71) Applicant: SKYWORKS SOLUTIONS, INC., Woburn, MA (US)

(72) Inventors: Stephane Richard Marie Wloczysiak, Irvine, CA (US); Joel Richard King, Newbury Park, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 16/374,691

(22) Filed: Apr. 3, 2019

(65) Prior Publication Data
US 2019/0230051 A1    Jul. 25, 2019

Related U.S. Application Data

(63) Continuation of application No. 15/689,824, filed on Aug. 29, 2017, now Pat. No. 10,257,119.

(60) Provisional application No. 62/380,820, filed on Aug. 29, 2016.

(51) Int. Cl.
| | | |
|---|---|---|
| H04L 12/947 | (2013.01) | |
| H04B 1/00 | (2006.01) | |
| H04W 40/02 | (2009.01) | |
| H04W 88/06 | (2009.01) | |
| H04W 4/80 | (2018.01) | |
| H04B 7/04 | (2017.01) | |
| H04W 84/12 | (2009.01) | |

(52) U.S. Cl.
CPC ............ *H04L 49/25* (2013.01); *H04B 1/0057* (2013.01); *H04B 1/0064* (2013.01); *H04W 40/02* (2013.01); *H04B 1/00* (2013.01); *H04B 7/04* (2013.01); *H04W 4/80* (2018.02); *H04W 84/12* (2013.01); *H04W 88/06* (2013.01)

(58) Field of Classification Search
CPC ..... H04L 49/25; H04B 1/0064; H04B 1/0057; H04B 1/00; H04B 7/04; H04W 40/02; H04W 88/06; H04W 84/12; H04W 4/80
See application file for complete search history.

(56) References Cited

U.S. PATENT DOCUMENTS

| | | | | |
|---|---|---|---|---|
| 9,172,441 | B2* | 10/2015 | Granger-Jones | ..... H04B 7/0404 |
| 2011/0095943 | A1* | 4/2011 | Letestu | .................... G01S 19/32 |
| | | | | 342/357.72 |
| 2011/0156812 | A1* | 6/2011 | Parkhurst | .............. H03F 1/0277 |
| | | | | 330/124 R |
| 2013/0043946 | A1* | 2/2013 | Hadjichristos | ....... H04B 1/0057 |
| | | | | 330/252 |
| 2013/0210364 | A1* | 8/2013 | Mayor | ................. H04B 1/3805 |
| | | | | 455/63.1 |

(Continued)

*Primary Examiner* — Hashim S Bhatti
(74) *Attorney, Agent, or Firm* — Chang & Hale LLP

(57) ABSTRACT

Described herein are systems, devices, and methods for a multi-standard radio switchable multiplexer that is configured to process wireless local area network (WLAN) signals and cellular signals in the same module without the use of cascaded filters. The disclosed systems use intelligent switching to direct cellular frequency bands along targeted paths and to direct WLAN signals along different paths, such as to a dedicated WLAN module for further processing. By removing notch filters coupled to cellular band filters and/or cascaded filters, insertion losses are reduced.

20 Claims, 12 Drawing Sheets

(56) References Cited

U.S. PATENT DOCUMENTS

| | | | |
|---|---|---|---|
| 2013/0265912 A1* | 10/2013 | Ikonen | H01Q 1/2291 370/278 |
| 2014/0119245 A1* | 5/2014 | Desjardins | H04B 1/0057 370/278 |
| 2015/0043687 A1* | 2/2015 | Luo | H04B 1/006 375/349 |
| 2015/0133067 A1* | 5/2015 | Chang | H04B 1/006 455/78 |
| 2015/0249479 A1* | 9/2015 | Nobbe | H04B 17/12 455/77 |
| 2016/0049965 A1* | 2/2016 | Khlat | H04B 1/0064 370/297 |
| 2016/0112072 A1* | 4/2016 | Bauder | H04B 1/0057 370/297 |
| 2017/0063404 A1* | 3/2017 | Langer | H04W 72/0453 |

* cited by examiner

US 10,623,337 B2

DIVERSITY RECEIVER CONFIGURATIONS WITHOUT CASCADED FILTERS

CROSS-REFERENCE TO RELATED APPLICATIONS

This application is a continuation of U.S. patent application Ser. No. 15/689,824 filed Aug. 29, 2017 and entitled "MULTI-STANDARD RADIO SWITCHABLE MULTIPLEXER," which claims priority to U.S. Provisional Application No. 62/380,820 filed Aug. 29, 2016 and entitled "MULTI-STANDARD RADIO SWITCHABLE MULTIPLEXER," each of which is expressly incorporated by reference herein in its entirety for all purposes.

BACKGROUND

Field

The present disclosure generally relates to front-end modules for wireless communication applications.

Description of Related Art

Wireless communication devices typically include components in a front-end module that are configured to filter and/or amplify received radio-frequency (RF) signals. The RF signals can be cellular signals, wireless local area network (WLAN) signals, GPS signals, BLUETOOTH® signals, or the like. The front-end module can be configured to direct these signals to appropriate filters, amplifiers, and/or downstream modules for processing.

SUMMARY

According to a number of implementations, the present disclosure relates to a reconfigurable multiplexer that includes a switching network including multi-path operability and connectability to a signal port. The reconfigurable multiplexer also includes a first filter implemented between the switching network and a first bi-directional port that is associated with a first radio access network and a second filter implemented between the switching network and a second bi-directional port that is associated with a second radio access network. The reconfigurable multiplexer also includes a controller implemented to control the switching network to provide a respective signal path between the signal port and each of either or both of the first bi-directional port and the second bi-directional port.

In some embodiments, the first filter is configured to pass a first cellular frequency band that corresponds to the first radio access network. In further embodiments, the second filter is configured to pass a wireless local area network frequency band that corresponds to the second radio access network. In yet further embodiments, the reconfigurable multiplexer further includes a third filter implemented between the switching network and a third bi-directional port that is associated with a third radio access network. In yet further embodiments, the third filter is configured to pass a second cellular frequency band that corresponds to the third radio access network, the wireless local area network frequency band being between the first cellular frequency band and the second cellular frequency band. In yet further embodiments, the switching network is configured to couple any combination of the first filter, the second filter, and the third filter to the signal port simultaneously. In further embodiments, the controller controls the switching network to provide a respective signal path between the signal port and any one or more of the first bi-directional port, the second bi-directional port, and the third bi-directional port.

According to a number of implementations, the present disclosure relates to a front end architecture that includes a reconfigurable multiplexer including a switching network having multi-path operability and connectability to a signal port and a filter assembly implemented between the switching network and a plurality of bi-directional ports each associated with a plurality of radio access networks. The front end architecture also includes an amplifier assembly coupled to the filter assembly, the amplifier assembly configured to amplify signals received from the filter assembly. The front end architecture also includes a controller implemented to control the switching network to provide respective signal paths between the signal port and any permutation of one or more of the plurality of bi-directional ports.

In some embodiments, the filter assembly includes at least one filter configured to pass signals within a wireless local area network frequency band. In some embodiments, at least one signal path from the filter assembly to one of the plurality of bi-directional ports does not pass through the amplifier assembly. In further embodiments, the at least one signal path corresponds to a radio access network associated with a wireless local area network frequency band. In further embodiments, the front end architecture further includes a duplexer configured to receive signals that pass through the at least one filter of the filter assembly. In further embodiments, the controller is further configured to control the duplexer.

In some embodiments, the filter assembly includes a first plurality of filters, each of the first plurality of filters being configured to pass signals within a respective cellular frequency band; and a second plurality of filters, each of the second plurality of filters being configured to pass signals within a respective wireless local area network frequency band. In further embodiments, the front end architecture also includes a duplexer associated with each of the second plurality of filters.

According to a number of implementations, the present disclosure relates to a wireless device that includes a diversity antenna and a triplexer configured to receive signals from the diversity antenna and to provide signals in a first frequency range along a first path and to provide signals in a second frequency range along a second path. The wireless device also includes a first reconfigurable multiplexer coupled to the first path from the triplexer at a first signal port, the first reconfigurable multiplexer including a first switching network and a first filter assembly implemented between the first switching network and a first plurality of bi-directional ports associated with a first plurality of radio access networks. The wireless device also includes a first amplifier assembly coupled to the first filter assembly, the first amplifier assembly configured to amplify signals received from the first filter assembly. The wireless device also includes a second reconfigurable multiplexer coupled to the second path from the triplexer at a second signal port, the second reconfigurable multiplexer including a second switching network and a second filter assembly implemented between the second switching network and a second plurality of bi-directional ports associated with a second plurality of radio access networks. The wireless device also includes a second amplifier assembly coupled to the second filter assembly, the second amplifier assembly configured to amplify signals received from the second filter assembly. The wireless device also includes a controller implemented to control the first switching network to provide respective signal paths between the first signal port and any permutation of one or more of the first plurality of bi-directional ports and to control the second switching network to provide respective signal paths between the second signal port and any permutation of one or more of the second plurality of bi-directional ports.

In some embodiments, the second plurality of radio access networks includes at least one radio access network corresponding to a wireless local area network frequency band. In some embodiments, the triplexer is further configured to receive signals from the diversity antenna and to provide signals in a third frequency range along a third path. In further embodiments, the second multiplexer is coupled to the third path from the triplexer at a third signal port, the second reconfigurable multiplexer including a third switching network that receives signals from the third signal port and directs them to a third plurality of bi-directional ports associated with a third plurality of radio access networks. In yet further embodiments, the third plurality of radio access networks includes at least one radio access network corresponding to a wireless local area network frequency band.

According to a number of implementations, the present disclosure relates to a diversity receiver module that includes a packaging substrate configured to receive a plurality of components and a reconfigurable multiplexer implemented on the packaging substrate, the reconfigurable multiplexer including a switching network including multi-path operability and connectability to a signal port, a first filter implemented between the switching network and a first bi-directional port that is associated with a first radio access network, and a second filter implemented between the switching network and a second bi-directional port that is associated with a second radio access network. The diversity receiver module also includes a controller implemented on the packaging substrate, the controller configured to control the switching network to provide a respective signal path between the signal port and each of either or both of the first bi-directional port and the second bi-directional port.

In some embodiments, the second radio access network corresponds to a wireless local area network frequency band.

According to a number of implementations, the present disclosure relates to a wireless device that includes a primary antenna and a diversity antenna spaced apart from the primary antenna, the diversity antenna configured to receive wireless signals corresponding to a plurality of radio access networks. The wireless device also includes a diversity receiver module in communication with the diversity antenna, the diversity receiver module including a packaging substrate configured to receive a plurality of components, the diversity receiver module further including a reconfigurable multiplexer implemented on the packaging substrate, the reconfigurable multiplexer including a switching network including multi-path operability and connectability to a signal port, a first filter implemented between the switching network and a first bi-directional port that is associated with a first radio access network of the plurality of radio access networks, and a second filter implemented between the switching network and a second bi-directional port that is associated with a second radio access network of the plurality of radio access networks. The wireless device also includes a controller configured to control the switching network to provide a respective signal path between the signal port and each of either or both of the first bi-directional port and the second bi-directional port.

In some embodiments, the second radio access network corresponds to a wireless local area network frequency band.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Described herein are systems, devices, and methods for a multi-standard radio switchable multiplexer that is configured to process a plurality of different radio access networks in the same module. For example, front end modules are disclosed that can concurrently process wireless local area network (WLAN) signals and cellular signals. This allows a single front end module to support concurrent operation of WLAN signals and cellular signals. This can be done using the switching networks described herein. In general, the described systems and methods can be configured to concurrently operate different radio systems (e.g., cellular, BLUETOOTH, WLAN, GPS, etc.) without the use of cascaded filters. This improves performance by reducing, for example, insertion losses resulting from the use of cascaded filters.

Introduction

Figure 1:
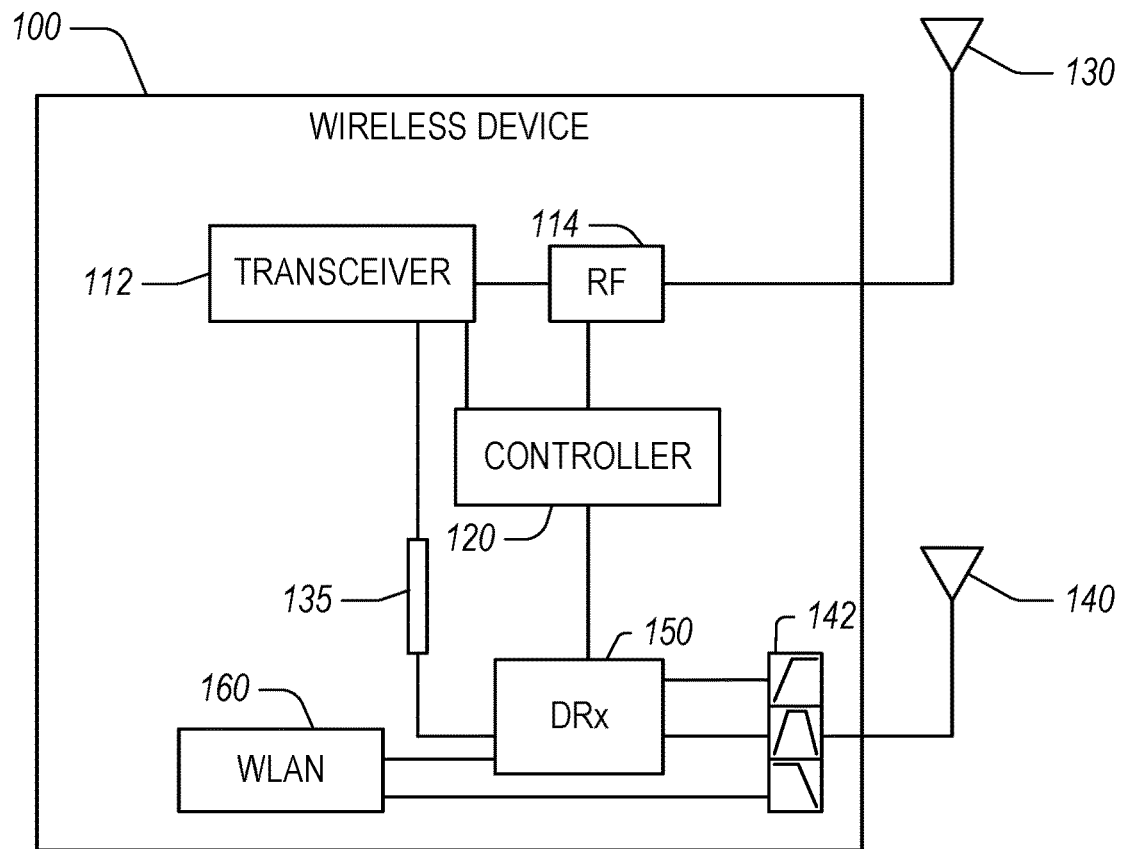
FIG. 1 illustrates a wireless device having a primary antenna and a diversity antenna.

FIG. 1 shows a wireless device 100 having a primary antenna 130 and a diversity antenna 140. The wireless device includes an RF module 114 and a transceiver 112 that may be controlled by a controller 120. The transceiver 112 is configured to convert between analog signals (e.g., radio-frequency (RF) signals) and digital data signals. To that end, the transceiver 112 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The RF module 114 is coupled between the primary antenna 130 and the transceiver 112. Because the RF module 114 may be physically close to the primary antenna 130 to reduce attenuation due to cable loss, the RF module 114 may be referred to as front-end module (FEM). The RF module 114 may perform processing on an analog signal received from the primary antenna 130 for the transceiver 112 or received from transceiver 112 for transmission via the primary antenna 130. To that end, the RF module 114 may include filters, power amplifiers, band select switches, matching circuits, and other components.

When a signal is transmitted to the wireless device, the signal may be received at both the primary antenna 130 and the diversity antenna 140. The primary antenna 130 and diversity antenna 140 may be physically spaced apart such that the signal at the primary antenna 130 and diversity antenna 140 is received with different characteristics. For example, in one embodiment, the primary antenna 130 and diversity antenna 140 may receive the signal with different attenuation, noise, frequency response, or phase shift. The transceiver 112 may use both of the signals with different characteristics to determine data bits corresponding to the signal. In some implementations, the transceiver 112 selects from between the primary antenna 130 and the diversity antenna 140 based on the characteristics, such as selecting the antenna with the highest signal-to-noise ratio. In some implementations, the transceiver 112 combines the signals from the primary antenna 130 and the diversity antenna 140 to increase the signal-to-noise ratio of the combined signal. In some implementations, the transceiver 112 processes the signals to perform multiple-input/multiple-output (MiMo) communication.

In some embodiments, the diversity antenna 140 is configured to receive signals within cellular frequency bands and wireless local area network (WLAN) frequency bands. In such embodiments, the wireless device 100 can include a multiplexer 142 coupled to the diversity antenna 140 that is configured to separate the diversity signal into different frequency ranges. For example, the multiplexer can be configured to include a low pass filter that passes a frequency range that includes low band cellular frequencies, a bandpass filter that passes a frequency range that includes low band WLAN signals and mid-band and high-band cellular signals, and a high pass filter that passes a frequency range that includes high-band WLAN signals. This example is merely for illustrative purpose. As another example, the multiplexer 142 can have a variety of different configurations such as a diplexer that provides the functionality of a high pass filter and a low pass filter. Additional example configurations are provided herein with different figures. It is to be understood, however, that the various configurations of the multiplexer 142 could be used with any suitable embodiment disclosed herein. In certain implementations, the multiplexer 142 comprises a multi-layer ceramic device, such as a low-temperature co-fired ceramic (LTCC).

Because the diversity antenna 140 is physically spaced apart from the primary antenna 130, the diversity antenna 140 is coupled to the transceiver 112 by a transmission line 135, such as a cable or a printed circuit board (PCB) trace. In some implementations, the transmission line 135 is lossy and attenuates the signal received at the diversity antenna 140 before it reaches the transceiver 112. Thus, in some implementations, gain is applied to the signal received at the diversity antenna 140. The gain (and other analog processing, such as filtering) may be applied by the diversity receiver module 150. Because such a diversity receiver module 150 may be located physically close to the diversity antenna 140, it may be referred to a diversity receiver front-end module, examples of which are described in greater detail herein.

Figure 2:
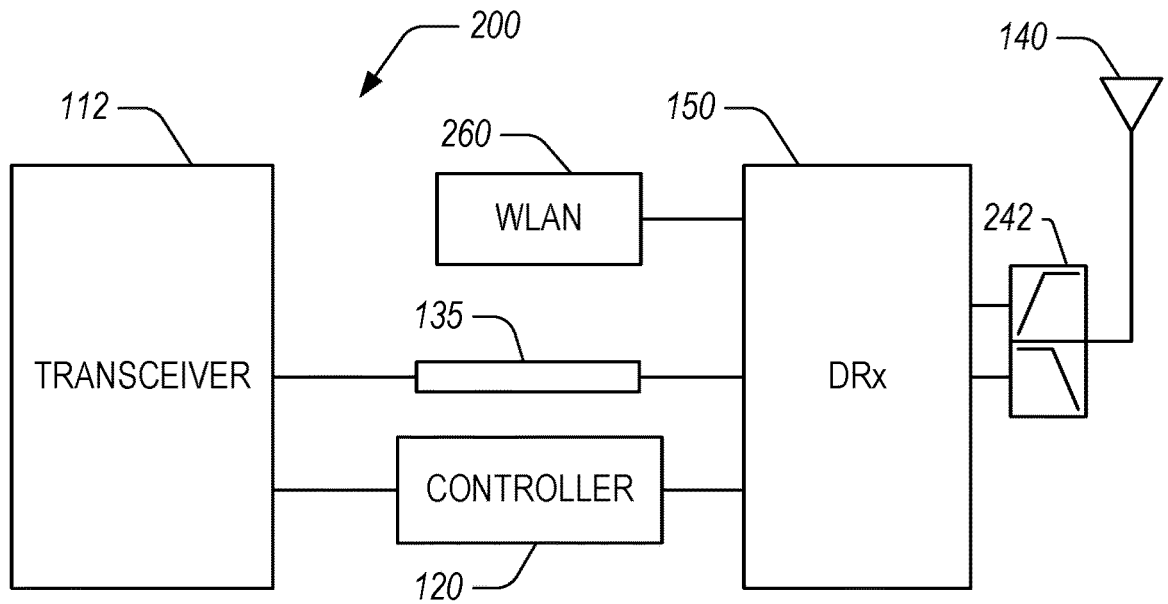
FIG. 2 illustrates a diversity receiver (DRx) configuration including a DRx front-end module (FEM).

FIG. 2 shows a diversity receiver (DRx) configuration 200 including a DRx front-end module (FEM) 150. The DRx configuration 200 includes a diversity antenna 140 that is configured to receive a diversity signal and provide the diversity signal to the DRx FEM 150 through a diplexer 242. The diplexer 242 can be configured to pass first signals having a frequency above a first threshold along a first path to the DRx FEM 150 and to pass second signals having a frequency below a second threshold along a second path to the DRx FEM 150. In some embodiments, the first threshold is greater than or equal to the second threshold. The first signals can include cellular signals (e.g., mid- and/or high-band cellular frequencies) mixed with WLAN signals and the second signals can include cellular signals (e.g., low-band cellular frequencies). In some embodiments, the first signals include cellular signals (e.g., mid- and/or high-band cellular frequencies) with or without WLAN signals and the second signals include cellular signals (e.g., low-band cellular frequencies).

The DRx FEM 150 is configured to perform processing on the diversity signals received from the diplexer 242. For example, the DRx FEM 150 may be configured to filter the diversity signals to one or more active frequency bands that can include cellular and/or WLAN frequency bands. The controller 120 can be configured to control the DRx FEM 150 to selectively direct signals to targeted filters to accomplish the filtering. As another example, the DRx FEM 150 may be configured to amplify one or more of the filtered signals. To that end, the DRx FEM 150 may include filters, low-noise amplifiers, band select switches, matching circuits, and other components. The controller 120 can be configured to interact with components in the DRx FEM 150 to intelligently select paths for the diversity signals through the DRx FEM 150.

The DRx FEM 150 transmits at least a portion of the processed diversity signals via a transmission line 135 to the transceiver 112. The transceiver 112 may be controlled by the controller 120. In some implementations, the controller 120 may be implemented within the transceiver 112.

The DRx FEM 150 may transmit at least a portion of the processed diversity signals to a wireless local area network (WLAN) module 260. If the diversity signal from the diversity antenna 140 includes WLAN signals, the controller 120 can control the DRx FEM 150 to direct such signals to the WLAN module 260.

The controller 120 can be configured to control the DRx FEM 150 to selectively direct signals to suitable signal paths. For example, the controller 120 and the DRx FEM 150 direct cellular signals through the transmission line 135 to the transceiver 112 and direct WLAN signals from the DRx FEM 150 to the WLAN module 260. Thus, the DRx configuration 200 can be configured to receive and process signals corresponding to cellular communication and WLAN communication. The controller 120 can be configured to intelligently direct signals through the DRx FEM 150 so that the received signal from the diversity antenna 140 is directed through appropriate filters and other components to reduce, for example, insertion losses.

Examples of Products and Architectures

In some wireless devices, it may be desirable to have simultaneous operation between different radio systems. For example, it may be desirable to have simultaneous operation between WLAN signals and cellular signals, BLUETOOTH® signals and cellular signals, GPS signals and cellular signals, etc. A possible configuration to enable this simultaneous operation includes a front end module for each radio system that is attached to an antenna to transmit and/or receive the targeted signals. However, as the number of radio systems increases, so does the number of antennas required to achieve this desirable simultaneous operation in such a configuration. This, for example, may make it challenging for the industrial design of a portable device where small size is of considerable importance. Another possible configuration to achieve the desired simultaneous operation includes using a particular multiplexer (e.g., an extractor) prior to any front end modules that is configured to extract and send targeted signals to corresponding front end modules for processing. However, such a component may undesirably add size and may undesirably increase insertion losses.

Accordingly, to solve these and other problems, the disclosed systems and methods integrate the multiplexing functionality into the front end module. The disclosed multi-standard, radio-switchable multiplexers support a shared radio antenna while reducing cost, size, and insertion loss relative to other existing configurations (e.g., extractors). For example, for a diversity cellular module sharing an antenna with a WLAN module, a WLAN filter can be integrated into the multiplexer in the diversity receive module. This can reduce path losses. Furthermore, the multiplexer can be switchable so that in single mode operation (e.g., a single radio access network), the loss is reduced and is comparable to a system or module configured solely for single radio support. Thus, the disclosed multiplexers and front end configurations are configured to integrate and merge the multiplexing functionality into the front end component (e.g., a DRx module, MiMo module, etc.) and to make the multiplexer switchable to reduce or optimize loss in various modes of operation (e.g., single, dual, etc. modes of operation).

Figure 3:
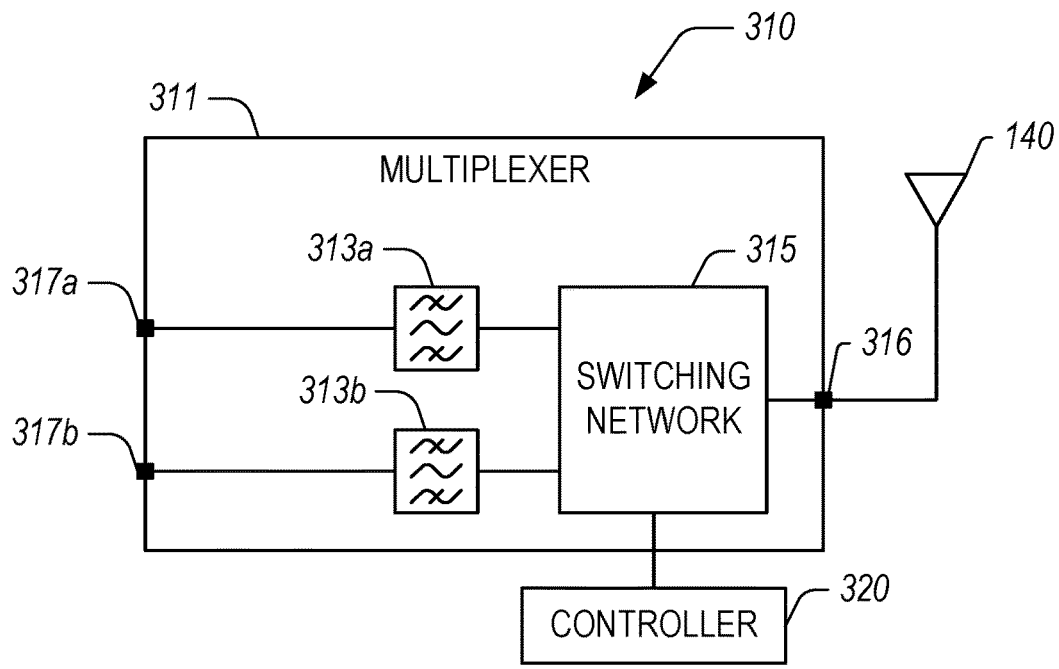
FIG. 3 illustrates an example of a reconfigurable multiplexer that can be implemented in a front end configuration.

FIG. 3 illustrates an example of a reconfigurable multiplexer 311 that can be implemented in a front end configuration 310, such as a front end module, diversity receiver module, and/or multiple input multiple output (MiMo) module, examples of some of which are described herein. The front end configuration 310 may be implemented in a module with multiple paths corresponding to multiple frequency bands and/or different communication protocols. The front end configuration 310 includes a diversity antenna 140 configured to receive a diversity signal. In some implementations, the diversity signal may be a single-band signal including data modulated onto a single frequency band. In some implementations, the diversity signal may be a multi-band signal (also referred to as an inter-band carrier aggregation signal) including data modulated onto multiple frequency bands and/or data modulated onto multiple frequency bands using different communication protocols.

The multiplexer 311 has an input 316 that receives the diversity signal from the diversity antenna 140 and a first output 317a that provides a processed diversity signal to another component, such as a transceiver described herein, and a second output 317b that provides a second processed signal to another component, such as a transceiver or a WLAN module as described herein. In some embodiments, the second processed signal is a WLAN signal that is sent to a WLAN module (not shown). In some implementations, the diversity signal passes through a diplexer, triplexer, or other multiplexer prior to being received at the input 316. The input 316 feeds into an input of a switching network 315. The switching network 315 includes a plurality of multiplexer outputs, individual outputs corresponding to a respective frequency band. The first output 317a and/or the second output 317b may be transmitted to a second multiplexer (not shown) for combining the signals.

The frequency bands may be cellular frequency bands, such as UMTS (Universal Mobile Telecommunications System) frequency bands. For example, a first frequency band may be UMTS downlink or "Rx" Band 2, between 1930 megahertz (MHZ) and 1990 MHz, and a second frequency band may be UMTS downlink or "Rx" Band 5, between 869 MHz and 894 MHz. Other downlink frequency bands may be used, such as those described below in Table 1 or other non-UMTS frequency bands. The frequency bands may also include wireless local area network (WLAN) frequency bands, such as frequency bands that support IEEE 802.11 wireless communication standards. For example, a first WLAN frequency band may be the 2.4 GHz ISM band (industrial, scientific, and medical) that may be between 2.4 GHz and 2.4835 GHz and a second WLAN frequency band may be the 5 GHz ISM band that may be between 5.15 GHz and 5.825 GHz. Other WLAN frequency bands may be used as well.

The front end configuration 310 includes a controller 320 that selectively activates one or more of the plurality of paths through the switching network 315. The controller 320 can intelligently activate selected paths based at least in part on a band selection signal received from another component in the front end configuration 310 or another component in a wireless device.

As noted herein, in some implementations, the diversity signal is a single-band signal. Thus, in some implementations, the switching network 315 is a single-pole/multiple-throw (SPMT) switch that routes the diversity signal to one of the plurality of paths corresponding to the frequency band of the single-band signal based on a signal received from the controller 320. The controller 320 may generate the signal based on a band select signal received from another component in the front end configuration 310 or from another component of a wireless device. In some instances, the single-band, diversity signal is a WLAN signal and the controller 320 is configured to route the signal from the multiplexer 311 to the second output 317b.

As noted herein, in some implementations, the diversity signal is a multi-band signal. Thus, in some implementations, the switching network 315 is a signal splitter that routes the diversity signal to two or more of the plurality of paths corresponding to the two or more frequency bands of the multi-band signal based on a splitter control signal received from the controller 320. The function of the signal splitter may be implemented as a SPMT switch, a diplexer filter, or some combination of these. The controller 320 may generate the splitter control signal based on a band select signal received by the controller 320 from another component or controller in the system.

Thus, in some implementations, the controller 320 is configured to selectively activate one or more of the plurality of paths based on a band select signal received by the controller 320. In some implementations, the controller 320 is configured to selectively activate one or more of the plurality of paths by transmitting a splitter control signal to a signal splitter such as the switching network 315.

The multiplexer 311 includes a plurality of bandpass filters 313a, 313b. Each bandpass filter 313a, 313b is disposed along a corresponding one of the plurality of paths and configured to filter a signal received at the bandpass filter to the respective frequency band of the one of the plurality of paths. In some implementations, the bandpass filters 313a, 313b are further configured to filter a signal received at the bandpass filter to a downlink frequency sub-band of the respective frequency band of the one of the plurality of paths.

The reconfigurable multiplexer 311 includes a switching network 315 configured for multi-path operability and connectability to a signal port 316. The multiplexer 311 can be configured to provide reconfigurable network selection using the switching network 315. For example, the multiplexer 311 can be configured to select one or more radio access networks for processing by closing and/or opening selected switches or otherwise forming selected paths through the switching network 315 and directing signals to designated filters associated with a desired or targeted radio access network. The intelligence for selecting the enabled paths through the multiplexer 311 can be provided by a controller 320.

The reconfigurable multiplexer 311 includes a first filter 313a implemented between the switching network 315 and a first bi-directional port 317a that is associated with a first radio access network. The reconfigurable multiplexer 311 also includes a second filter 313b implemented between the switching network 315 and a second bi-directional port 317b that is associated with a second radio access network. The filters 313a, 313b can be any suitable filter, such as the filters described in greater detail elsewhere herein. In some implementations, the filter 313a is configured to filter signals corresponding to the first radio access network, where the first radio access network corresponds to a first frequency band corresponding to a cellular or WLAN communication standard. Similarly, in some implementations, the filter 313b is configured to filter signals corresponding to the second radio access network, where the second radio access network corresponds to a second frequency band corresponding to a cellular or WLAN communication standard.

The controller 320 can be implemented to control the switching network 315 to provide a respective signal path between the signal port 316 and each of either or both of the first bi-directional port 317a and the second bi-directional port 317b.

The controller 320 can receive an indication of desired signals (e.g., radio access networks) or an indication of expected signals (e.g., radio access networks) and enable corresponding paths through the switching network 315 to the filters 313a, 313b. The switching network 315 can be implemented as a signal splitter, a diplexer, a combination of switches, or the like, as described in greater detail elsewhere herein. The controller 320 is configured to switch the paths through the switching network 315 so that the signals received at the signal port 316 from the diversity antenna 140 are selectively passed through either one or both of the filters 313a, 313b to select out signals from the first radio access network, the second radio access network, or both the first and second radio access networks. Accordingly, the controller 320 intelligently controls the switching network 315 for reconfigurable network selection using the multiplexer 311.

In some implementations, the multiplexer 311 is a reconfigurable multiplexer controllable by the controller 320. For example, in some implementations, the controller 320 is configured to selectively and intelligently activate one or more paths within the multiplexer 311 to route the diversity signal to corresponding one or more outputs. The multiplexer 311, for example, can include a switching network 315 that can selectively provide one or more simultaneous paths through the switching network 315 to respective outputs of the multiplexer 311. The controller 320 is configured to selectively activate one or more of the plurality of paths based at least in part on information regarding the content of the diversity signal (e.g., the frequency bands present in the diversity signal).

As noted herein, the input 316 receives a diversity signal from the diversity antenna 140 and the first bi-directional port 317a provides a processed diversity signal to a transceiver (e.g., via a transmission line). In some embodiments, the input 316 receives a diversity signal from the diversity antenna 140 and the second bi-directional port 317b provides a processed diversity signal to a WLAN module.

Figure 4:
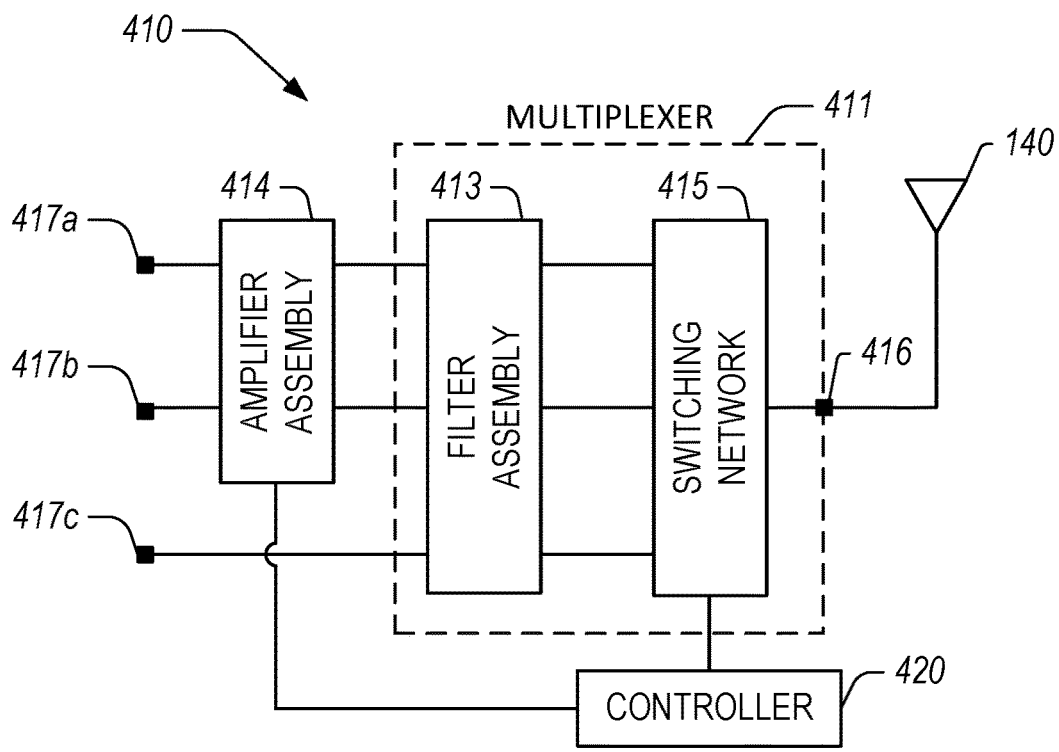
FIG. 4 illustrates an example of another reconfigurable multiplexer that can be implemented in a front end configuration.

FIG. 4 illustrates an example of another reconfigurable multiplexer 411 that can be implemented in a front end configuration 410, such as a front end module, diversity receiver module, and/or multiple input multiple output (MiMo) module, examples of some of which are described herein. The multiplexer 411 is similar to the multiplexer 311 described herein with reference to FIG. 3, except that the multiplexer 411 includes a filter assembly 413 and an amplifier assembly 414. As illustrated, the multiplexer 411 receives a signal at a signal port 416 and provides up to 3 signals at output ports 417a-417c. It is to be understood, however, that the multiplexer 411 can provide any suitable number of output signals at 2 or more output ports. The number of signal paths and output ports illustrated in FIG. 4 is for illustrative purposes only. The concepts described herein with respect to the multiplexer 411 can be extended to any desirable number of signal paths and output ports.

The multiplexer 411 can be configured to provide reconfigurable network selection using the switching network 415. For example, the multiplexer 411 can be configured to select one or more radio access networks for processing by forming selected paths through the switching network 415 and directing signals to designated filters and/or amplifiers associated with a desired or targeted radio access network. The intelligence for selecting the enabled paths through the multiplexer 411 can be provided by a controller 420, similar to the controller 320 described herein with reference to FIG. 3.

The filter assembly 413 provides filtering for the respective signals provided by the switching network 415. The filter assembly 413 includes at least one filter per signal path through the filter assembly 413. The filters in the filter assembly 413 can be similar to the filters 313a, 313b described herein with reference to FIG. 3. A filter for an individual signal path through the filter assembly 413 can be designed to a pass a frequency band associated with a particular radio access network. The radio access networks can correspond to cellular frequency bands, examples of which are described in Table 1 herein, and/or WLAN frequency bands.

The amplifier assembly 414 provides amplification for signals that pass through the assembly. In some embodiments, the amplifier assembly 414 provides amplification for a subset of the signal paths through the multiplexer 411. For example, a signal path can pass from the filter assembly 413 to the output port 417c without passing through the amplifier assembly 414. This signal path can then be coupled to a dedicated module configured to process and/or amplify the signals from the output port 417c, such as a WLAN module configured to process WLAN signals. In some embodiments, the signals that pass through both the filter assembly 413 and the amplifier assembly 414 are cellular signals and the signals that pass through the filter assembly 413 and not the amplifier assembly 414 are WLAN signals. In some embodiments, WLAN signals pass through the filter assembly 413 and the amplifier assembly 414.

The amplifier assembly 414 can include one or more amplifiers disposed along a corresponding one of the plurality of paths through the multiplexer, with the amplifiers being configured to amplify a signal received at the amplifier assembly 414. In some embodiments, the filter assembly 413 includes a bandpass filter that is configured to filter a signal corresponding to a WLAN signal and pass that signal to third output 417c, without passing through the amplifier assembly 414. For example, a corresponding amplifier for the WLAN signal may be included in a WLAN module (not shown) and not included in the amplifier assembly 414. In some implementations, the filter assembly 413 includes a plurality of bandpass filters associated with particular radio access networks.

In some implementations, the amplifier assembly 414 includes narrowband amplifiers configured to amplify a signal within the respective frequency band of the path in which the amplifier is disposed. In some implementations, the amplifier assembly 414 is controllable by the controller 420. For example, in some implementations, each of the amplifiers in the amplifier assembly 414 includes an enable/disable input and is enabled (or disabled) based on an amplifier enable signal received and the enable/disable input. The amplifier enable signal may be transmitted by the controller 420. Thus, in some implementations, the controller 420 is configured to selectively activate one or more of the plurality of paths by transmitting an amplifier enable signal to one or more of the amplifiers in the amplifier assembly 414 respectively disposed along one or more of the plurality of paths. In such implementations, rather than being controlled by the controller 420, the multiplexer 411 may include a signal splitter that routes the diversity signal to each of the plurality of paths. However, in implementations in which the controller 420 controls the multiplexer 411, the controller 420 may also enable (or disable) particular amplifiers in the amplifier assembly 414, e.g., to save battery.

In some implementations, the amplifier assembly 414 includes variable-gain amplifiers (VGAs). Thus, in these implementations, the front end configuration 410 includes a plurality of variable-gain amplifiers (VGAs), each one of the VGAs disposed along a corresponding one of the plurality of paths and configured to amplify a signal received at the VGA with a gain controlled by an amplifier control signal received from the controller 420.

The gain of a VGA may be bypassable, step-variable, continuously-variable. In some implementations, at least one of the VGAs includes a fixed-gain amplifier and a bypass switch controllable by the amplifier control signal. The bypass switch may (in a first position) close a line between an input of the fixed-gain amplifier to an output of fixed-gain amplifier, allowing a signal to bypass the fixed-gain amplifier. The bypass switch may (in a second position) open the line between the input and the output, passing a signal through the fixed-gain amplifier. In some implementations, when the bypass switch is in the first position, the fixed-gain amplifier is disabled or otherwise reconfigured to accommodate the bypass mode.

In some implementations, at least one of the VGAs includes a step-variable gain amplifier configured to amplify the signal received at the VGA with a gain of one of plurality of configured amounts indicated by the amplifier control signal. In some implementations, at least one of the VGAs includes a continuously-variable gain amplifier configured to amplify a signal received at the VGA with a gain proportional to the amplifier control signal.

In some implementations, the amplifier assembly 414 includes variable-current amplifiers (VCAs). The current drawn by a VCA may be bypassable, step-variable, continuously-variable. In some implementations, at least one of the VCAs includes a fixed-current amplifier and a bypass switch controllable by the amplifier control signal. The bypass switch may (in a first position) close a line between an input of the fixed-current amplifier to an output of fixed-current amplifier, allowing a signal to bypass the fixed-current amplifier. The bypass switch may (in a second position) open the line between the input and the output, passing a signal through the fixed-current amplifier. In some implementations, when the bypass switch is in the first position, the fixed-current amplifier is disabled or otherwise reconfigured to accommodate the bypass mode.

In some implementations, at least one of the VCAs includes a step-variable current amplifier configured to amplify the signal received at the VCA by drawing a current of one of plurality of configured amounts indicated by the amplifier control signal. In some implementations, at least one of the VCAs includes a continuously-variable current amplifier configured to amplify a signal received at the VCA by drawing a current proportional to the amplifier control signal.

In some implementations, the amplifier assembly 414 includes fixed-gain, fixed-current amplifiers. In some implementations, the amplifier assembly 414 includes fixed-gain, variable-current amplifiers. In some implementations, the amplifier assembly 414 includes variable-gain, fixed-current amplifiers. In some implementations, the amplifier assembly 414 includes variable-gain, variable-current amplifiers.

In some implementations, the controller 420 generates the amplifier control signal(s) based on a quality of service metric of an input signal received at the input. In some implementations, the controller 420 generates the amplifier control signal(s) based on a signal received from a communications controller, which may, in turn, be based on a quality of service (QoS) metric of the received signal. The QoS metric of the received signal may be based, at least in part, on the diversity signal received on the diversity antenna 140 (e.g., an input signal received at the input). The QoS metric of the received signal may be further based on a signal received on a primary antenna. In some implementations, the controller 420 generates the amplifier control signal(s) based on a QoS metric of the diversity signal without receiving a signal from the communications controller.

In some implementations, the QoS metric includes a signal strength. As another example, the QoS metric may include a bit error rate, a data throughput, a transmission delay, or any other QoS metric.

In some implementations, the controller 420 controls the gain (and/or current) of the amplifiers in the amplifier assembly 414. In some implementations, the controller 420 controls the gain of other components of the wireless device, such as amplifiers in the front-end module (FEM), based on an amplifier control signal.

The front end configuration 410 is configured to receive signals from the diversity antenna 140 that may include a combination of cellular and WLAN signals (or a combination of cellular and BLUETOOTH®, a combination of cellular and GPS, etc.). The front end configuration 410 can provide one or more advantages over other configurations that extract WLAN signals, or other signals, prior to passing the extracted signals to respective modules (e.g., front end modules, MiMo modules, WLAN modules, etc.). For example, as described in greater detail with respect to FIG. 12, the front end configuration 410 can be configured to reduce insertion losses by reducing the number of filters used to extract cellular frequencies and/or using particular filters that reduce signal losses for cellular frequencies. The font end configuration 410 can provide these reduced insertion losses through the use of intelligent selection of signals that are filtered for WLAN frequencies, cellular frequencies, or a combination of WLAN and cellular frequencies, the intelligent selection being accomplished using the switching network 415 and the controller 420.

In some embodiments, the output ports 417a-417c are bi-directional signal ports, configured to transmit and receive radio access network signals. In such embodiments, the amplifier assembly 414 can include amplifiers configured to amplify signals for transmission as well as amplifiers configured to amplify received signals. Furthermore, in such embodiments, the filter assembly 413 can include duplexers configured to filter received signals and signals to be transmitted by the antenna 140.

Although not illustrated, it is to be understood that 2 or more of the output ports 417a-417c can be passed to a second multiplexer for signal combination. In some embodiments, one or more of the output ports 417a-417c can be passed to another module without being combined with the other signals from other output ports. It is also to be understood that the front end configuration 410 can include additional components that are not included in the illustrations, such as components for impedance matching, phase matching, additional filtering, amplification, switching, etc.

Figure 5:
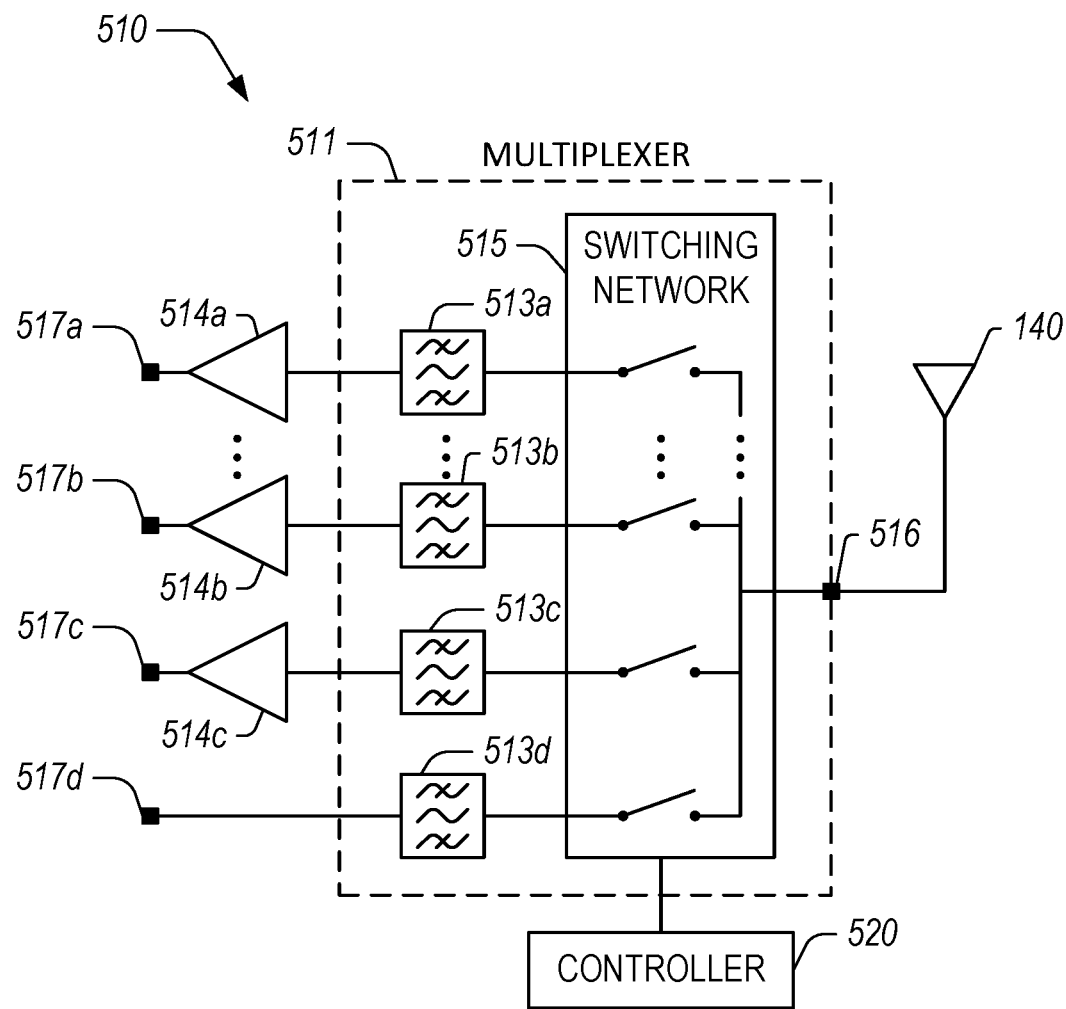
FIG. 5 illustrates another example of a front end configuration that includes a plurality of filters coupled to a switching network in a multiplexer.

FIG. 5 illustrates another example of a front end configuration 510 that includes a plurality of filters 513a-513d coupled to the switching network 515 in a multiplexer 511. The front end configuration 510 also includes a plurality of amplifiers 514a-514c coupled to a subset of the filtered paths from the filters 513a-513c. The switching network 515 is illustrated as a plurality of single pole, single throw switches that can be independently operated. The controller 520 is configured to selectively operate the switches in the switching network 515 to intelligently select desired or targeted paths through the switching network 515 for further filtering with an associated filter 513a-513d and possibly amplification with an associated amplifier 514a-514c.

The front end configuration 510 can be configured to select one or more of a plurality of cellular signals that can be output at output ports 517a-517c in combination with a WLAN signal that can be selected and output at output port 517d. As illustrated, it is to be understood that the number of filters, associated amplifiers, and associated output ports can be expanded to cover any suitable number of cellular networks. For example, the front end configuration 510 can include N+1 switchable paths where each of N paths passes through a particular filter associated with a cellular frequency band and a corresponding amplifier, and the remaining path passes through a filter associated with WLAN signals (e.g., a WLAN 2.4 GHz signal).

Figure 6:
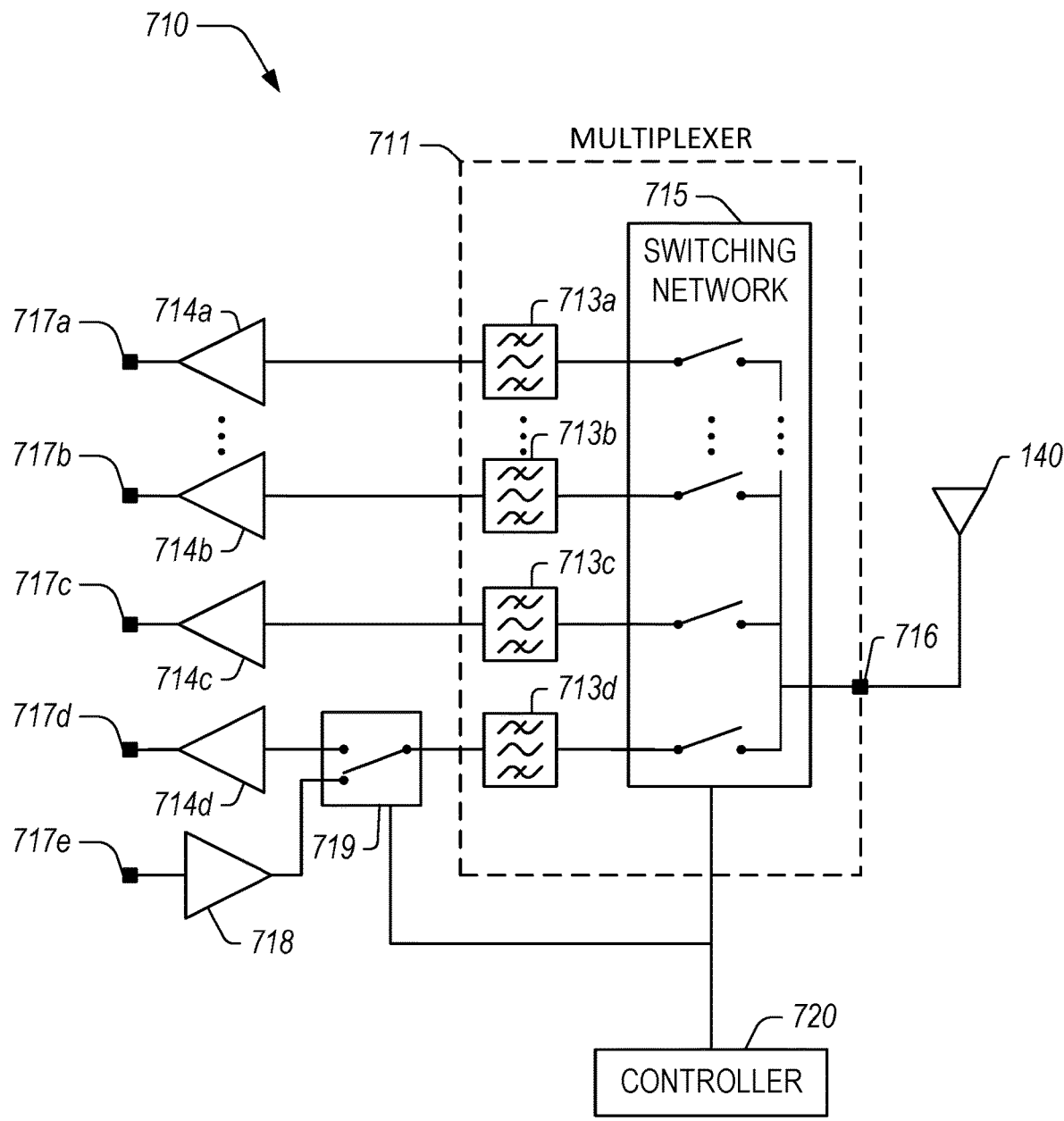
FIG. 6 illustrates a front end configuration that supports multiple cellular frequency bands and bi-directional communication for WLAN signals.

FIG. 6 illustrates a front end configuration 710 that supports multiple cellular frequency bands and bi-directional communication for WLAN signals. The front end configuration 710 includes a multiplexer 711 that is similar to the multiplexers 411, 511 respectively described with reference to FIGS. 4 and 5. The front end configuration 710 includes a switching network 715, filters 713a-713d, and amplifiers 714a-714c similar to the switching network 515, filters 513a-513d, and amplifiers 514a-514c described in greater detail herein with reference to FIG. 5. The front end configuration 710 further includes a duplexer 719 (e.g., a switch) that provides for bi-directional communication of WLAN signals. The front end configuration 710 includes a controller 720 that is configured to selectively control the switching network 715 and the duplexer 719. The front end configuration 710 also includes an amplifier 714d configured to amplify received WLAN signals (e.g., a low-noise amplifier or LNA) and an amplifier 718 configured to amplify WLAN signals for transmission (e.g., a power amplifier or PA). The WLAN signals for transmission can be received at WLAN transmit port 717e and passed to signal port 716 for transmission using antenna 140. Accordingly, the front end configuration 710 can be configured to multiplex multiple cellular signals, extract received WLAN signals, and process WLAN signals for transmission. In some embodiments, the front end configuration 710 is configured to support simultaneous processing of multiple mid-band and/or high-band cellular frequency bands in conjunction with filtering WLAN 2.4 GHz signals.

Figure 7:
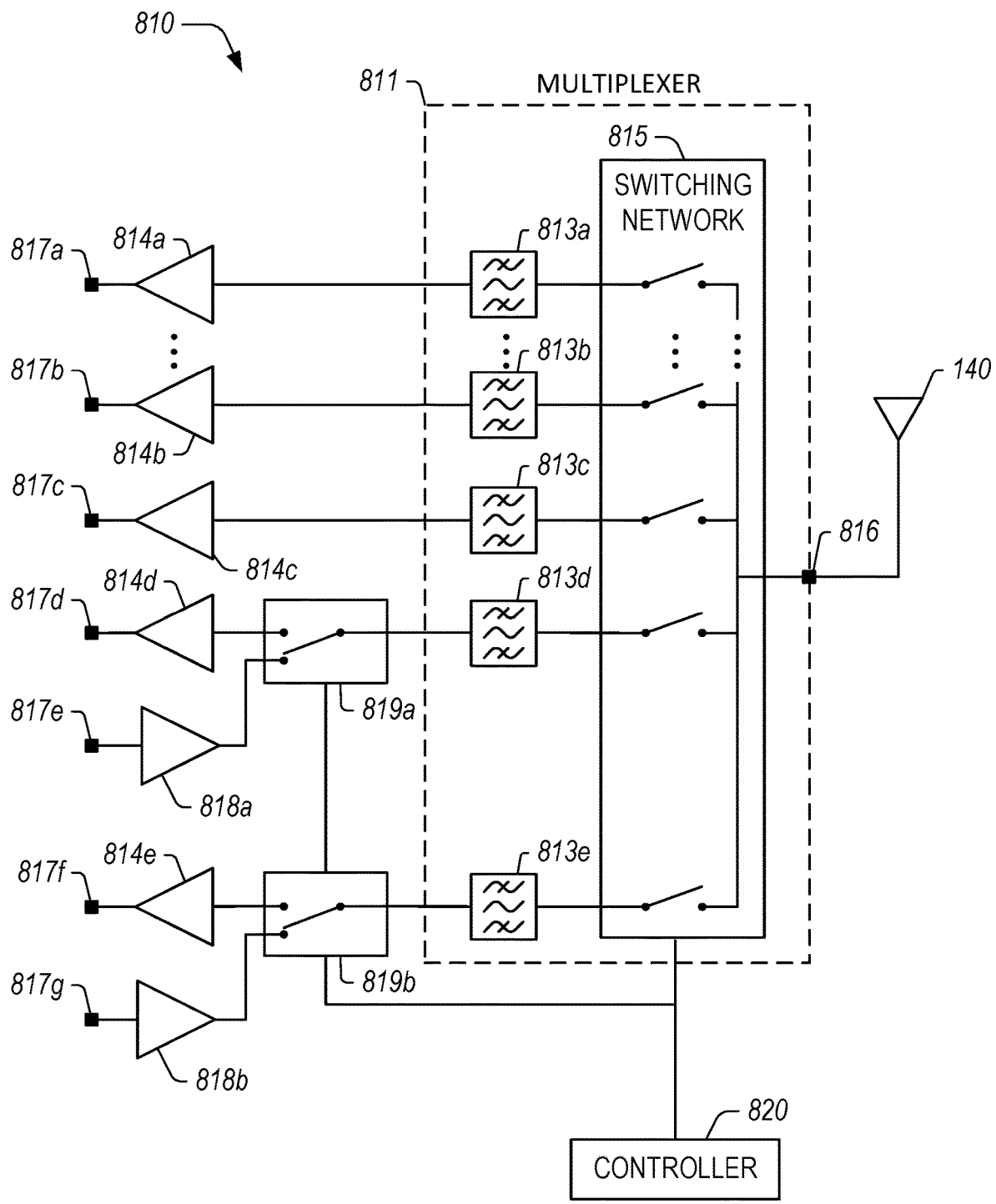
FIG. 7 illustrates a front end configuration that supports multiple cellular frequency bands and bi-directional communication for multiple WLAN signal bands.

FIG. 7 illustrates a front end configuration 810 that supports multiple cellular frequency bands and bi-directional communication for multiple WLAN signal bands. Similar to the front end configuration 710 described with reference to FIG. 6, the front end configuration 810 includes a plurality of signal paths for cellular signals, the paths configured to pass through a switching network 815, filters 813a-813c, and amplifiers 814a-814c. Expanding on the front end configuration 710 described with reference to FIG. 6, the front end configuration 810 supports bi-directional communication for two WLAN signal frequency bands (e.g., WLAN 2.4 GHz signals and WLAN 5 GHz signals). The front end configuration 810 includes two duplexers 819a, 819b that support bi-directional communication for WLAN signals. The front end configuration 810 selectively provides a path from the switching network 815, through filters 813d, 813e and amplifiers 814d, 814e to output ports 817d, 817f for received WLAN signals. The front end configuration 810 selectively provides a path from WLAN transmit ports 817e, 817g through amplifiers 818a, 818b, filters 813d, 813e, and switching network 815 to signal port 816 for transmission with antenna 140. The front end configuration 810 includes a controller 820 that is configured to selectively control the switching network 815 and the duplexers 819a, 819b. Accordingly, the front end configuration 810 can be configured to multiplex multiple cellular signals, extract received WLAN signals from multiple WLAN frequency bands, and process WLAN signals for transmission from multiple WLAN frequency bands. In some embodiments, the front end configuration 810 is configured to support simultaneous processing of multiple mid-band and/or high-band cellular frequency bands in conjunction with filtering WLAN 2.4 GHz and 5 GHz signals.

Figure 8:
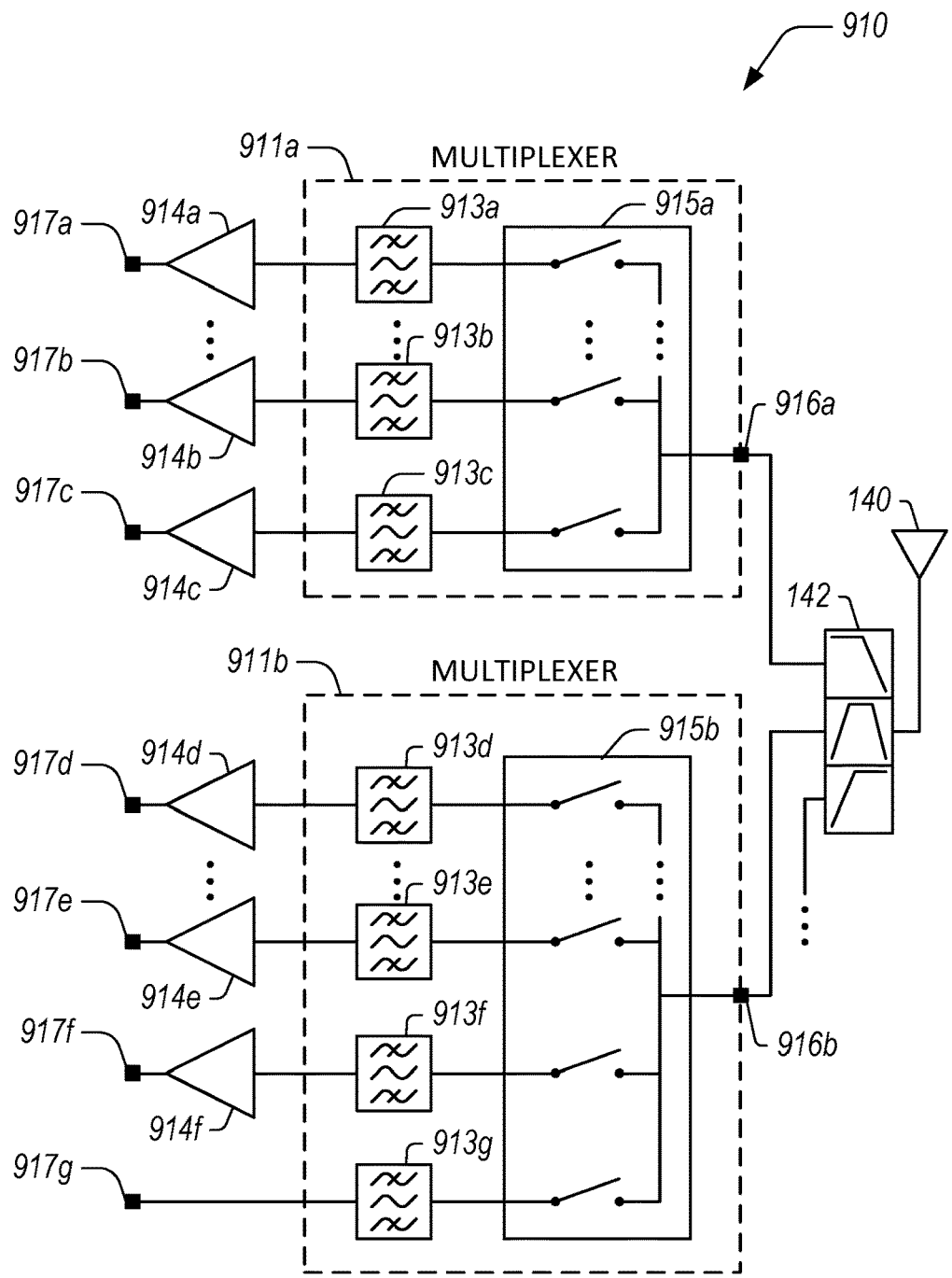
FIG. 8 illustrates a front end configuration that includes multiplexers that respectively support low-band (LB) cellular signals and mid-band/high-band (MB-HB) cellular signals with WLAN 2.4 GHz signals.

FIG. 8 illustrates a front end configuration 910 that includes multiplexers 911a, 911b that respectively support low-band (LB) cellular signals and mid-band/high-band (MB-HB) cellular signals with WLAN 2.4 GHz signals. Prior to sending signals to the multiplexers 911a, 911b, signals from the antenna 140 pass through a triplexer 142, as described herein with reference to FIG. 1. The triplexer 142 can include a low-pass filter that passes low-band cellular frequencies to the multiplexer 911a. The triplexer 142 can include a band-pass filter that passes mid-band and high-band cellular signals as well as WLAN signals to the multiplexer 911b. The triplexer 142 can include a high-pass filter that passes ultrahigh-band cellular signals and/or higher frequency WLAN signals to another multiplexer or module (not shown). Although not shown for the sake of clarity in the figure, it is to be understood that the front end configuration 910 includes a controller configured to selectively control switching networks 915a, 915b.

The front end configuration 910 includes the multiplexer 911a for low-band cellular signals, the multiplexer 911a similar to the multiplexer 311 described herein in greater detail with reference to FIG. 3. The front end configuration 910 includes the multiplexer 911b for mid-band and high-band cellular signals as well as WLAN signals (e.g., WLAN 2.4 GHz signals), the multiplexer 911b similar to the multiplexer 511 described herein in greater detail with reference to FIG. 5. In some embodiments, the multiplexer 911a is configured to support cellular frequency bands that are less than a threshold frequency defined by the triplexer 142. In certain implementations, the multiplexer 911a does not include a path for WLAN signals. In some embodiments, the multiplexer 911b is configured to support cellular frequency bands that are within a range of frequencies defined by the triplexer 142. In certain implementations, the multiplexer 911b includes a plurality of paths, each path corresponding to a cellular frequency band, and a single path corresponding to a WLAN frequency band (e.g., WLAN 2.4 GHz), the WLAN frequency band falling within the range of frequencies covered by the plurality of cellular frequency bands.

The front end configuration 910 can be configured to integrate a WLAN signal path into a front end module to select out WLAN signals for further processing in a dedicated module. This is in contrast to using the triplexer 142 or other multiplexer to select out WLAN signals for processing in a dedicated module. Accordingly, the front end configuration 910 can be configured to replace a bulky WLAN/cell multiplexer with a simple diplexer or triplexer (e.g., a LC diplexer or LC triplexer) while maintaining simultaneous WLAN/cell operation. This can significantly reduce cell insertion loss.

The front end configuration 910 can be configured to support a system with 2×2 MiMo sharing that supports LB and MB-HB cellular frequencies and WLAN 2.4G frequencies. The front end configuration 910 can be repeated for each of a plurality of antennas. For example, the front end configuration 910 can be repeated to support a system having 4×4 MiMo sharing that supports LB and MB-HB cellular frequencies and WLAN 2.4G frequencies.

Figure 9:
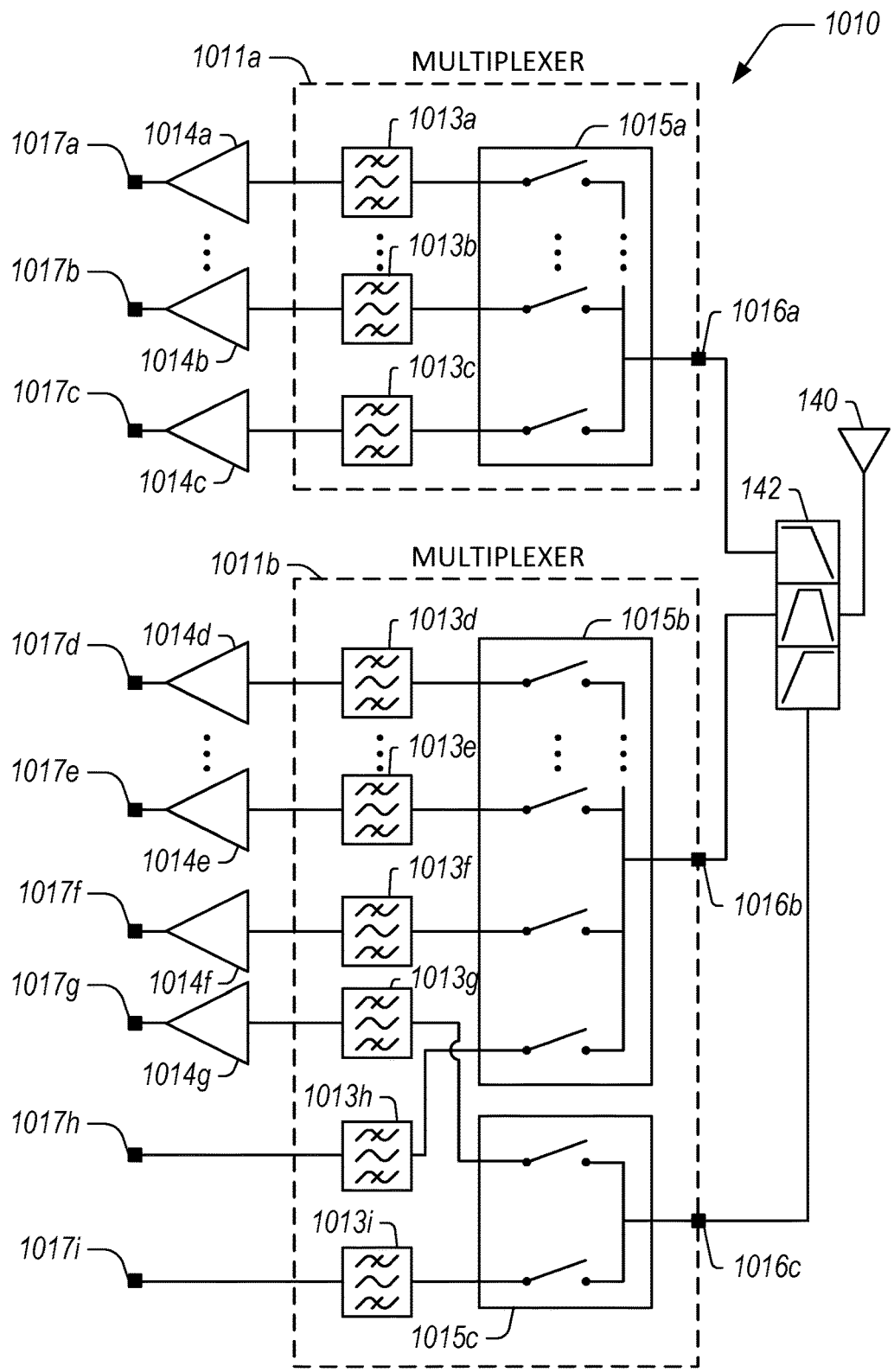
FIG. 9 illustrates a front end module configured to support LB, MB-HB, and UHB cellular signals as well as multiple WLAN signal frequency bands.

FIG. 9 illustrates a front end module 1010 configured to support LB, MB-HB, and UHB cellular signals as well as multiple WLAN signal frequency bands (e.g., WLAN 2.4 GHz and WLAN 5 GHz). The front end configuration 1010 includes a multiplexer 1011a for LB cellular signals that is similar to the multiplexer 911a described herein with reference to FIG. 8. The front end configuration 1010 includes a second multiplexer 1011b that is configured to support MB-HB cellular signals, UHB cellular signals, and WLAN signals having a frequency range that is near or within the MB-HB cellular frequency range and higher frequency WLAN signals having a frequency range that is near or within the UHB cellular frequency range. As in FIG. 8, it is to be understood that a controller is present that controls the switching networks 1015a-1015c.

The second multiplexer 1011b includes a first switching network 1015b and a second switching network 1015c. The first switching network 1015b is configured to selectively route signals that fall within the MB-HB cellular frequency range, including WLAN signals. Similarly, the second switching network 1015c is configured to selectively route signals that fall within the UHB cellular frequency range, including WLAN signals. The first and second switching networks 1015b, 1015c route cellular signals through filters 1013d-1013g and corresponding amplifiers 1014d-1014g to output ports 1017d-1017g. Similarly, the first and second switching networks 1015b, 1015c route WLAN signals through filters 1013h, 1013i to output ports 1017h-1017i.

The triplexer 142 filters LB cellular signals from the antenna 140, the LB cellular signals being directed to the switching network 1015a in the multiplexer 1011a. The triplexer 142 filters MB-HB cellular signals and WLAN signals within the MB-HB cellular frequency range, these filtered signals being directed to the first switching network 1015b in the second multiplexer 1011b. The triplexer 142 filters UHB cellular signals and WLAN signals above the MB-HB cellular frequency range, these filtered signals being directed to the second switching network 1015c in the second multiplexer 1011b. The first switching network 1015b, under control of a controller, routes cellular signals through corresponding filters 1013d-1013f and amplifiers 1014d-1014f. The first switching network 1015b, under control of a controller, routes WLAN signals through a corresponding filter 1013h. Similarly, the second switching network 1015c, under control of a controller, routes cellular signals through a corresponding filter 1013g and amplifier 1014g. The second switching network 1015c, under control of a controller, routes WLAN signals through a corresponding filter 1013i. Accordingly, the front end configuration 1010 can be configured to support cellular frequencies across a wide range of cellular frequency bands as well as WLAN signals falling within any of these cellular frequency bands. Insertion losses can be reduced due at least in part to the combination of filters and the triplexer 142 that intelligently and selectively filters cellular signals and WLAN signals within the front end configuration 1010.

The front end configuration 1010 can be configured to support a system with 2×2 MiMo sharing and cell/WLAN 2.4G/5G signals. By repeating the illustrated configuration two times, for example, a system with 4×4 MiMo sharing and cell/WLAN 2.4G/5G signals can be supported.

Figure 10:
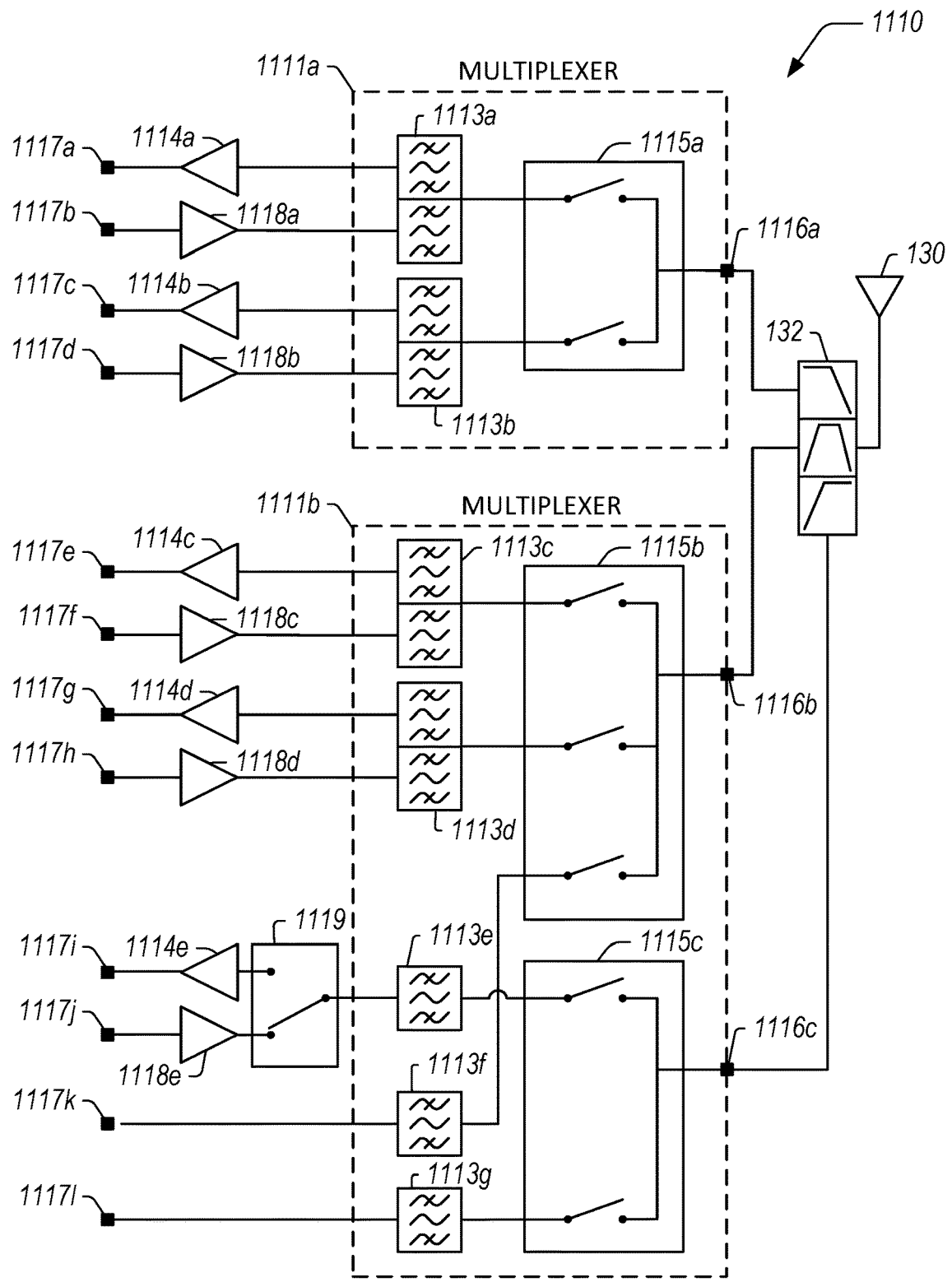
FIG. 10 illustrates a front end configuration configured for bi-directional communication for cellular frequency bands.

FIG. 10 illustrates a front end configuration 1110 configured for bi-directional communication for cellular frequency bands. As described herein, the antenna 130 receives signals that are split into three frequency bands by a triplexer 132. Similarly, signals from three different signal bands are combined by the triplexer 132 for transmission with the antenna 130. LB cellular signals are routed through a first multiplexer 1111a having a switching network 1115a and a duplexer for each path through the first multiplexer 1111*a*. For example, the first multiplexer 1111*a* is illustrated with two paths and two duplexers 1113*a*, 1113*b*. It is to be understood, however, that additional paths can be provided with the multiplexer 1111*a*. For each cellular frequency band or radio access network, a receive amplifier 1114*a*, 1114*b* is provided to amplify received signals and a transmit amplifier 1118*a*, 1118*b* is provided to amplify signals for transmission.

MB-HB cellular signals are routed through a second multiplexer 1111*b* having a first switching network 1115*b* and a duplexer for each path associated with a cellular frequency band. For example, the second multiplexer 1111*b* is illustrated with two paths and two duplexers 1113*c*, 1113*d* coupled to the first switching network 1115*b*. It is to be understood, however, that additional paths can be provided with the second multiplexer 1111*b*. For each cellular frequency band or radio access network, a receive amplifier 1114*c*, 1114*d* is provided to amplify received signals and a transmit amplifier 1118*c*, 1118*d* is provided to amplify signals for transmission.

UHB cellular signals are routed through the second multiplexer 1111*b* having a second switching network 1115*c* and a filter 1113*e* associated with a cellular frequency band. The UHB cellular signal is routed through a duplexer 1119 (e.g., a switch) that routes received signals and signals for transmission through the filter 1113*e* and the second switching network 1115*c*. For the cellular frequency band or radio access network, a receive amplifier 1114*e* is provided to amplify received signals and a transmit amplifier 1118*e* is provided to amplify signals for transmission.

WLAN signals provided at the second signal port 1116*b* from the triplexer 132 are routed through the first switching network 1115*b* and through a first WLAN filter 1113*f*. Similarly, WLAN signals provide at the third signal port 1116*c* from the triplexer are routed through the second switching network 1115*c* and through a second WLAN filter 1113*g*. In some embodiments, the WLAN signals at the second signal port 1116*b* correspond to WLAN 2.4 GHz signals and the WLAN signals at the third signal port 1116*c* correspond to WLAN 5 GHz signals.

The front end configuration 1110 can be implemented in a front end module to transmit and receive cellular and WLAN signals. The front end configuration 1110 can be repeated twice and combined with two copies of the front end configuration 1010 described herein with reference to FIG. 9 to form a system with cell and WLAN 4×4 MiMo sharing that supports cellular and WLAN 2.4G/5G signals. The front end configuration 1110 can support primary paths in a wireless device, for example, while the front end configuration 1010 can support diversity paths in the wireless device.

Figure 11:
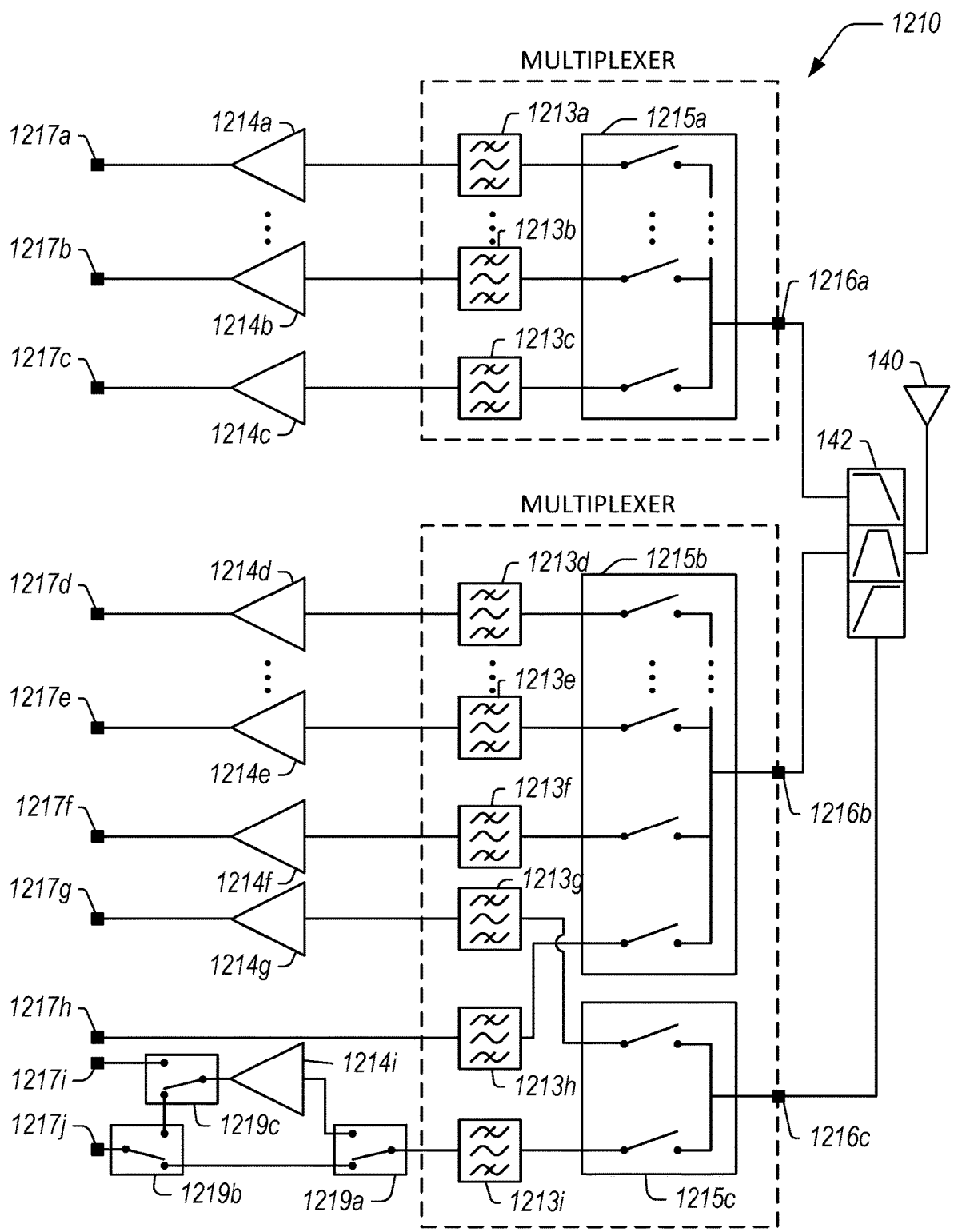
FIG. 11 illustrates a front end configuration that expands on the front end configuration of FIG. 9 to support additional communication standards, such as LTE-LAA (License Assisted Access) that uses unlicensed spectrum to increase data throughput.

FIG. 11 illustrates a front end configuration 1210 that expands on the front end configuration 1010 described herein with reference to FIG. 9 to support additional communication standards, such as LTE-LAA (License Assisted Access) that uses unlicensed spectrum to increase data throughput. The front end configuration 1210 is similar to the front end configuration 1010, additionally including a plurality of switches 1219*a*-1219*c* to selectively direct signals in the WLAN 5G frequency band to a WLAN module or to direct the signals through an amplifier 1214*i* which can then be processed as a cellular signal at output port 1217*i* or be passed to a WLAN module at port 1217*j*. In some embodiments, signals that pass through the filter 1213*i* are passed to a WLAN module at port 1217*j* without passing through the amplifier 1214*i*. The signal routed through the amplifier 1214*i* and out through port 1217*i* can be used to provide LTE-LAA capabilities. The filter 1213*i* can be configured as a filter for WLAN 5G signals.

Figure 12:
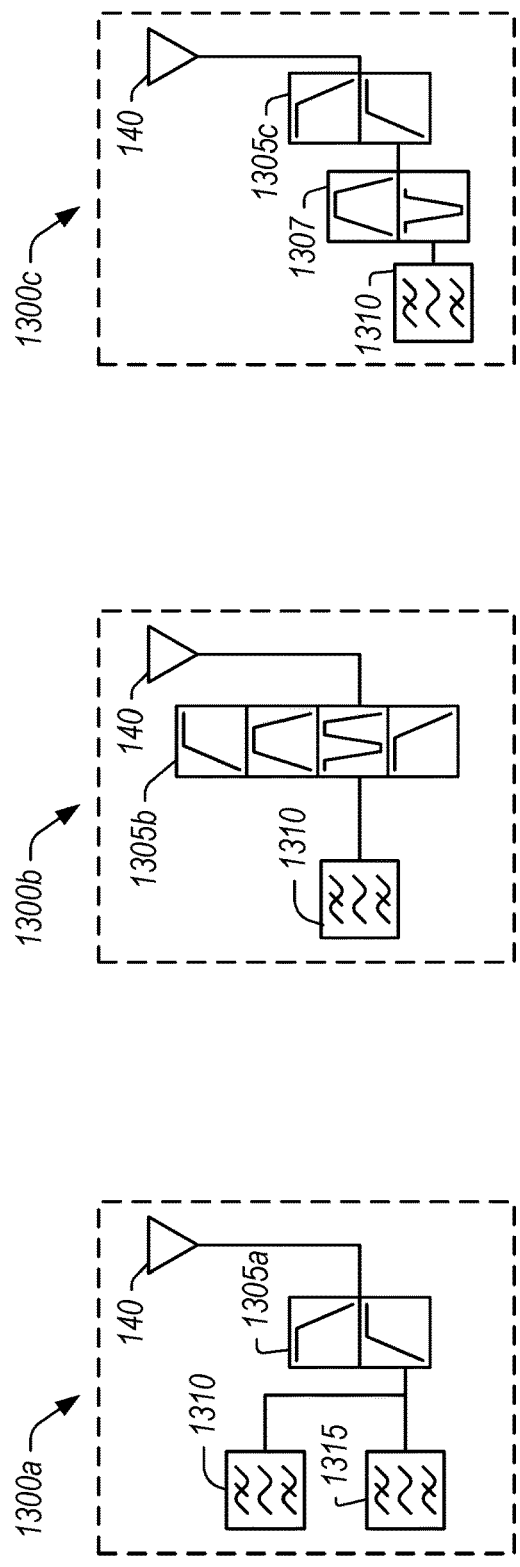
FIG. 12 illustrates a comparison of different filter and multiplexer architectures.
Figure 12:
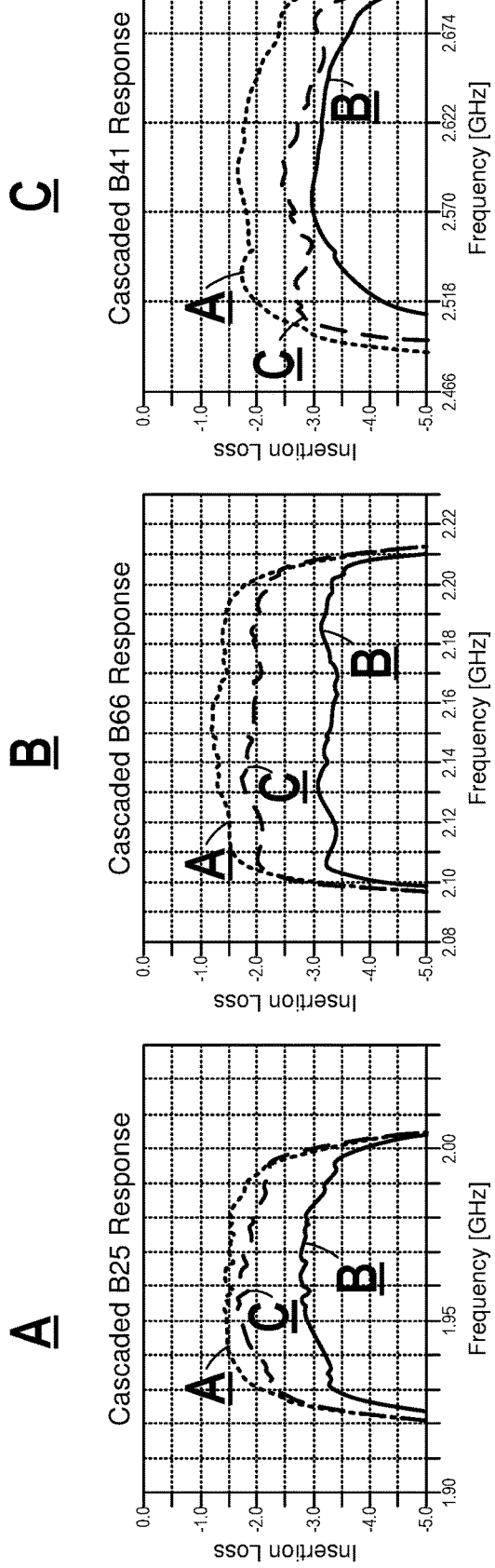

FIG. 12 illustrates a comparison of different filter and multiplexer architectures. The plots provide simulated data corresponding to the three different architectures to illustrate improvements in insertion losses associated with incorporating WLAN and cellular filters into a multiplexer after an external multiplexer. Examples of front end configurations that incorporate WLAN and cellular filters into a multiplexer after an external multiplexer are provided herein. In some embodiments, performance is improved by removing cascaded filters. In some embodiments, the disclosed architectures enable concurrent operation of WLAN and cellular through the use of multiplexers with switching networks as described herein.

A first example architecture 1300*a* (with data plotted and identified with the label "A" in the plots) includes an antenna 140, a diplexer 1305*a*, a cellular filter 1310, and a WLAN filter 1315. In some embodiments, the diplexer 1305*a* can be a low temperature co-fired ceramic (LTCC) filter. This general architecture corresponds to the example front end configurations described herein with reference to FIGS. 3-11. Although not illustrated, it is to be understood that a switching network can be implemented between the diplexer 1305*a* and the filters 1310, 1315.

A second example architecture 1300*b* (with data plotted and identified with the label "B" in the plots) includes an antenna 140, a multiplexer 1305*b*, and a cellular filter 1310. This general architecture corresponds to configurations that extract cellular and WLAN signals at the multiplexer 1305*b* for routing directly to dedicated modules (e.g., diversity modules, MiMo modules, WLAN modules, etc.).

A third example architecture 1300*c* (with data plotted and identified with the label "C" in the plots) includes an antenna 140, a first diplexer 1305*c*, a second diplexer 1307, and a cellular filter 1310. This general architecture corresponds to configurations that first divide signals into high and low frequencies, followed by an extractor that extracts WLAN signals from cellular signals.

The three plots correspond to insertion losses as a function of frequency for three example cellular frequency bands: B25, B66, and B41. The cellular filter 1310 thus corresponds, respectively, to the B25 cellular band in the plot on the left, to the B66 cellular band in the plot in the middle, and to the B41 cellular band in the plot on the right. In each plot, the first configuration 1300*a* is demonstrated to reduce insertion losses relative to the other two architectures 1300*b*, 1300*c*. Accordingly, by incorporating cellular and WLAN filters into a reconfigurable multiplexer, as described herein, insertion losses can be reduced relative to architectures that use diplexers, triplexers, multiplexers, and/or cascaded filters to extract WLAN signals prior to filtering the signals for desired or targeted cellular frequency bands. Due at least in part to the first architecture 1300*a* intelligently filtering received signals to extract WLAN signals when appropriate, insertion losses can be reduced. Similarly, insertion losses can be reduced due at least in part to the losses introduced by the diplexer 1305*a* in the first example architecture 1300*a* being less than the losses introduced by the multiplexer 1305*b* in the second example architecture 1300*b* and the combination of the first diplexer 1305*c* and the second diplexer 1307 in the third example architecture 1300*c*. Accordingly, the first architecture 1300*a* can improve multiplexing cellular and WLAN signals by using switches in parallel to direct signals into dedicated filters for particular radio access networks. This can, for example, reduce insertion losses that arise from cascading multiple filters such as cascading a notch filter and a dedicated filter for a particular radio access network.

As described herein, the front end configurations can be configured to route a WLAN signal through a front end module (e.g., a DRx module) and perform at least one filtering operation. These architectures may be particularly beneficial when cellular signals and WLAN signals are close together. When these signals are close to one another, losses may increase due at least in part to the use of cascading of filters or to the use of notch filters on cellular signals to remove or extract WLAN signals. The described front end configurations may also enable the removal of filters in other modules, such as a WLAN module, through the incorporation of dedicated filters into the front end configuration. In some implementations, the use of dedicated filters in a reconfigurable multiplexer, as described herein, can provide performance similar to a system with a dedicated antenna for each radio access network or for each communication protocol (e.g., cellular, WLAN, BLUETOOTH®, GPS, etc.).

Examples of Modules, Architectures, and Devices

Figure 13:
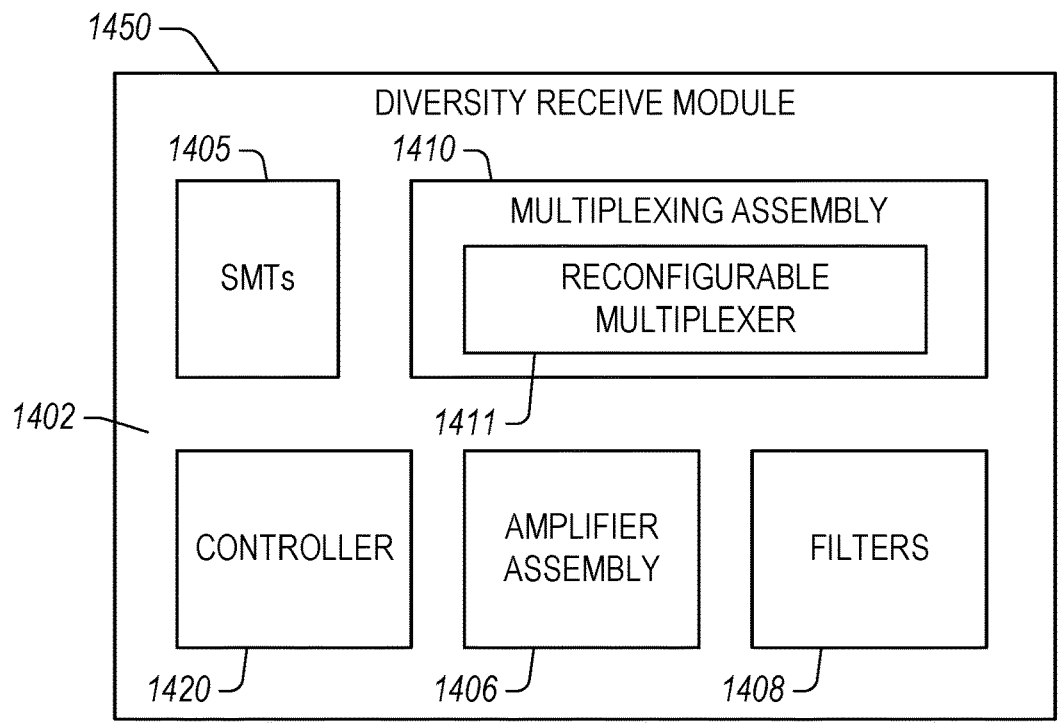
FIG. 13 illustrates that in some embodiments, some or all of the diversity receiver configurations can be implemented, wholly or partially, in a module.

FIG. 13 shows that in some embodiments, some or all of the diversity receiver configurations, including some or all of the diversity receiver configurations having combinations of features (e.g., FIGS. 3-11), can be implemented, wholly or partially, in a module. Such a module can be, for example, a front-end module (FEM). Such a module can be, for example, a diversity receiver (DRx) FEM. Such a module can be, for example, a multi-input, multi-output (MiMo) module.

In the example of FIG. 13, a module 1450 can include a packaging substrate 1402, and a number of components can be mounted on such a packaging substrate 1402. For example, a controller 1420 (which may include a front-end power management integrated circuit [FE-PIMC]), an amplifier assembly 1406 having one or more features as described herein (e.g., power amplifiers, low noise amplifiers, etc.), a multiplexing assembly 1410 that includes a reconfigurable multiplexer 1411, and a filter bank 1408 (which may include one or more bandpass filters) can be mounted and/or implemented on and/or within the packaging substrate 1402. In some embodiments, the filter bank 1408 is implemented as part of the multiplexing assembly 1410. Other components, such as a number of SMT devices 1405, can also be mounted on the packaging substrate 1402. Although all of the various components are depicted as being laid out on the packaging substrate 1402, it will be understood that some component(s) can be implemented over other component(s).

Figure 14:
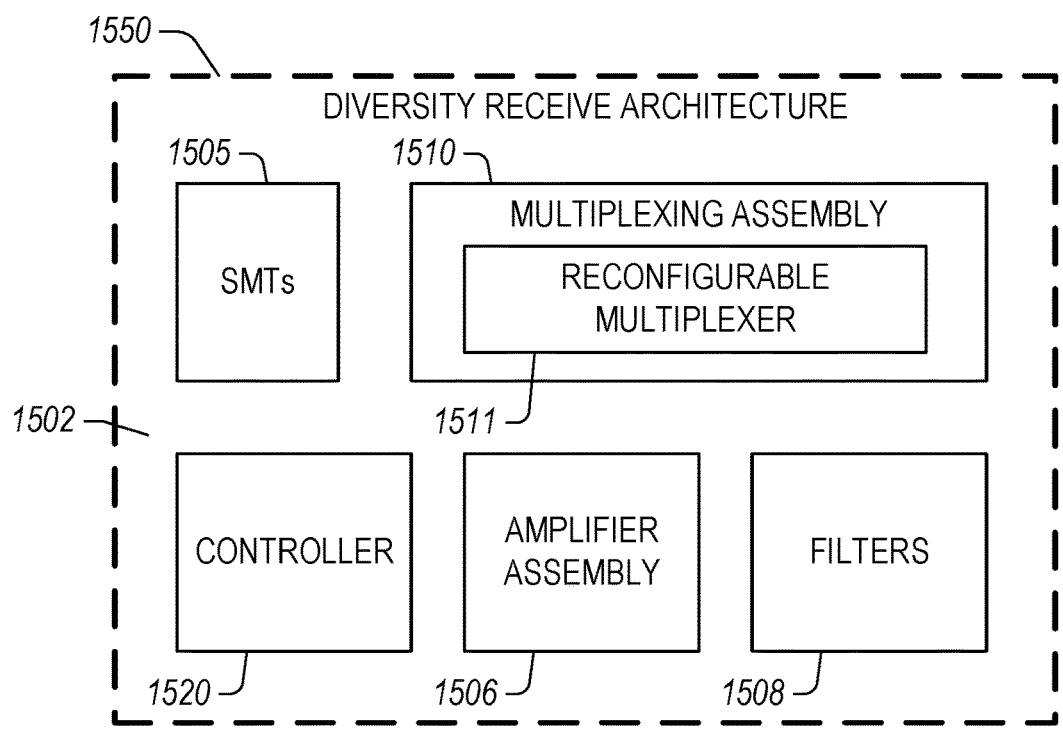
FIG. 14 illustrates that in some embodiments, some or all of the diversity receiver configurations can be implemented, wholly or partially, in an architecture.

FIG. 14 shows that in some embodiments, some or all of the diversity receiver configurations, including some or all of the diversity receiver configurations having combinations of features (e.g., FIGS. 3-11), can be implemented, wholly or partially, in an architecture. Such an architecture may include one or more modules, and can be configured to provide front-end functionality such as diversity receiver (DRx) front-end functionality.

In the example of FIG. 14, an architecture 1550 can include a controller 1520 (which may include a front-end power management integrated circuit [FE-PIMC]), an amplifier assembly 1506 having one or more features as described herein (e.g., power amplifiers, low noise amplifiers, etc.), a multiplexing assembly 1510 having a reconfigurable multiplexer 1511, and a filter bank 1508 (which may include one or more bandpass filters). In some embodiments, the filter bank 1508 is implemented as part of the multiplexing assembly 1510. Other components, such as a number of SMT devices 1505, can also be implemented in the architecture 1550.

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 15:
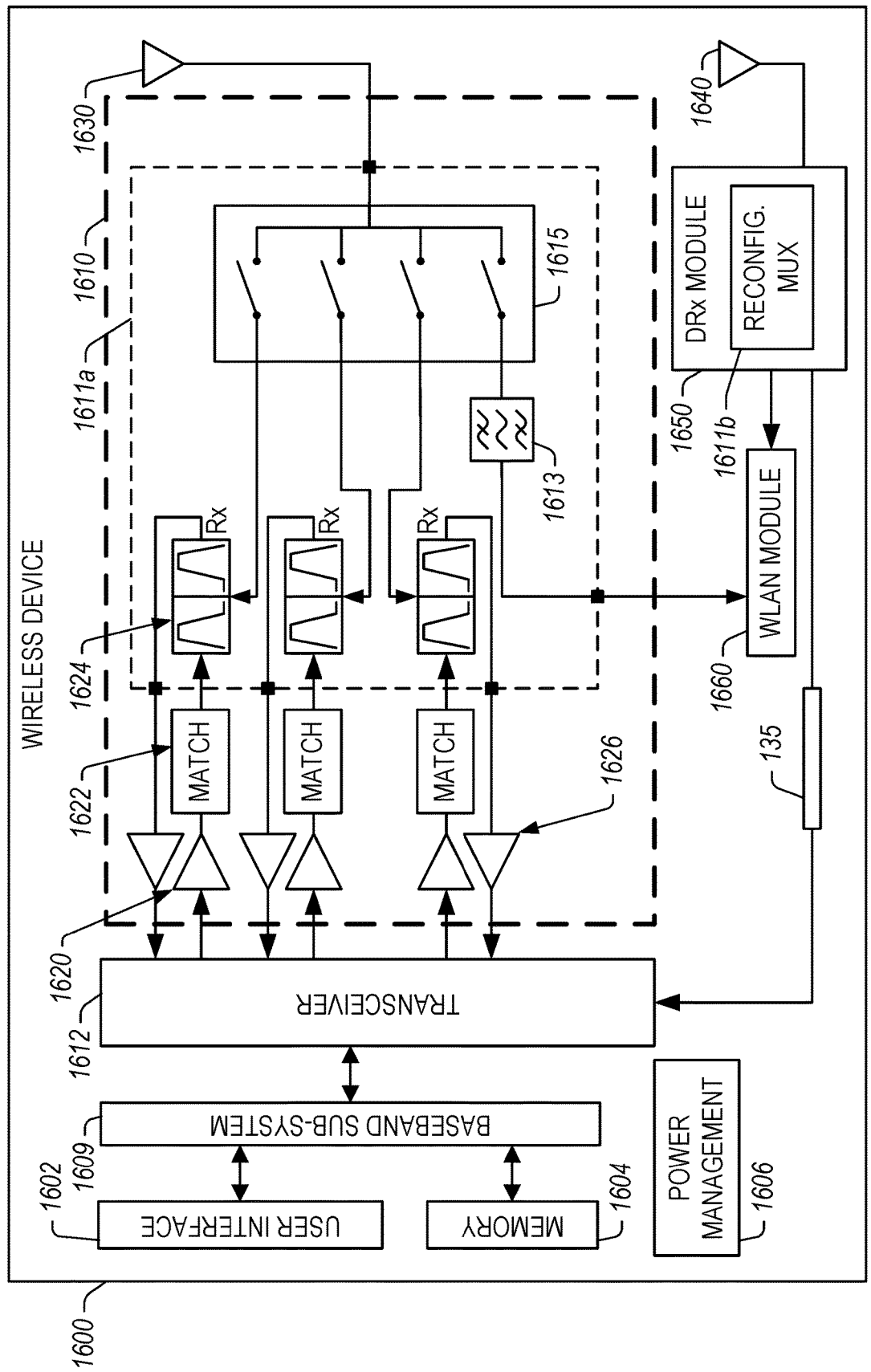
FIG. 15 illustrates an example wireless device having one or more advantageous features described herein.

FIG. 15 depicts an example wireless device 1600 having one or more advantageous features described herein. In the context of one or more modules having one or more features as described herein, such modules can be generally depicted by a dashed box 1610 (which can be implemented as, for example, a front-end module), a diversity receiver (DRx) module 1650 (which can be implemented as, for example, a front-end module), and a wireless local area network (WLAN) module 1660.

Power amplifiers (PAs) 1620 can receive their respective RF signals from a transceiver 1612 that can be configured and operated to generate RF signals to be amplified and transmitted, and to process received signals. The transceiver 1612 is shown to interact with a baseband sub-system 1609 that is configured to provide conversion between data and/or voice signals suitable for a user and RF signals suitable for the transceiver 1612. The transceiver 1612 can also be in communication with a power management component 1606 that is configured to manage power for the operation of the wireless device 1600. Such power management can also control operations of the baseband sub-system 1609 and the modules 1610, 1650, and 1660.

The baseband sub-system 1609 is shown to be connected to a user interface 1602 to facilitate various input and output of voice and/or data provided to and received from the user. The baseband sub-system 1609 can also be connected to a memory 1604 that is configured to store data and/or instructions to facilitate the operation of the wireless device, and/or to provide storage of information for the user.

In the example wireless device 1600, outputs of the PAs 1620 are shown to be matched (via respective match circuits 1622) and routed to their respective duplexers 1624. Such amplified and filtered signals can be routed to a primary antenna 1630 through a switching network 1615 for transmission. In some embodiments, the duplexers 1624 can allow transmit and receive operations to be performed simultaneously using a common antenna (e.g., primary antenna 1630). Received signals can be routed to "Rx" paths that can include, for example, a low-noise amplifier (LNA) 1626.

In the example wireless device 1600, signals received at the primary antenna 1630 can be sent to a reconfigurable multiplexer 1611a in the front end module 1610. The reconfigurable multiplexer 1611a can include duplexers 1624 that include bandpass filters configured to pass frequencies corresponding to particular radio access networks. In some embodiments, at least one path through the multiplexer 1611a corresponds to a WLAN signal that is sent to the WLAN module 1660 or another WLAN module of the wireless device 1600. This path passes through the filter 1613 configured to pass signals corresponding to the WLAN signal. In some implementations, the reconfigurable multiplexer 1611a can be similar to the multiplexer 1111b described herein with reference to FIG. 10.

The wireless device also includes a diversity antenna 1640 and a diversity receiver module 1650 that receives signals from the diversity antenna 1640. The diversity receive module includes a reconfigurable multiplexer 1611*b*, similar to the reconfigurable multiplexer 1611*a* in the front end module 1610. The diversity receiver module 1650 and the reconfigurable multiplexer 1611*b* process the received signals and transmit the processed cellular signals via a transmission line 135 to the transceiver 1612. The diversity receiver module 1650 and the reconfigurable multiplexer 1611*b* process the received signals and transmit the processed WLAN signals to the WLAN module 1660. In some embodiments, a diplexer or triplexer can be included between the diversity antenna 1640 and the diversity Rx module 1650, as described herein.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. It is to be understood that the term radio frequency (RF) and radio frequency signals refers to signals that include at least the frequencies listed in Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A diversity receiver configuration comprising:
an antenna multiplexer configured to receive a diversity signal from a diversity antenna and to provide signals in a first frequency range along a first signal path, the first frequency range including a cellular frequency band and a wireless local area network frequency band;
a switching network configured to receive the signals in the first frequency range and to direct signals within the cellular frequency band along a first output path and to simultaneously direct signals within the wireless local area network frequency band along a second output path.

2. The diversity receiver configuration of claim 1 wherein the diversity receiver configuration is configured to concurrently process cellular signals and wireless local area network signals without the use of cascaded filters.

3. The diversity receiver configuration of claim 1 wherein the antenna multiplexer is a diplexer.

4. The diversity receiver configuration of claim 1 wherein the antenna multiplexer is a triplexer.

5. The diversity receiver configuration of claim 1 wherein the antenna multiplexer is further configured to provide signals in a second frequency range along a second signal path, the second frequency range including a second cellular frequency band and a second wireless local area network frequency band.

6. The diversity receiver configuration of claim 5 further comprising a second switching network configured to receive the signals in the second frequency range and to direct signals within the second cellular frequency band along a third output path and to simultaneously direct signals within the second wireless local area network frequency band along a fourth output path.

7. The diversity receiver configuration of claim 6 wherein the second output path and the fourth output path are electrically coupled to a wireless local area network module.

8. The diversity receiver configuration of claim 7 wherein the antenna second output path and the fourth output path are not coupled to an amplifier prior to the wireless local area network module.

9. The diversity receiver configuration of claim 6 wherein the antenna multiplexer is further configured to provide signals in a third frequency range along a third signal path, the third frequency range including a third cellular frequency band and a fourth cellular frequency band.

10. The diversity receiver configuration of claim 9 further comprising a third switching network configured to receive the signals in the third frequency range and to direct signals within the third cellular frequency band along a fifth output path and to simultaneously direct signals within the fourth cellular frequency band along a sixth output path.

11. The diversity receiver configuration of claim 1 further comprising a filter coupled to the first output path, the first filter configured to pass signals within the cellular frequency band.

12. The diversity receiver configuration of claim 11 further comprising a second filter coupled to the second output path, the second filter configured to pass signals within the wireless local area network frequency band.

13. The diversity receiver configuration of claim 1 further comprising a duplexer coupled to the second output path, the duplexer configured to provide bi-directional communication of wireless local area network signals.

14. A wireless device comprising:
a diversity antenna configured to receive a diversity signal, the diversity signal including signals within a first frequency range that includes a cellular frequency band and a wireless network frequency band;
an antenna multiplexer coupled to the diversity antenna and configured to provide signals in the first frequency range along a first signal path;
a diversity receiver module including a switching network configured to receive the signals in the first frequency range and to direct signals within the cellular frequency band along a first output path and to simultaneously direct signals within the wireless local area network frequency band along a second output path;
a wireless local area network module coupled to the second output path to receive the signals within the wireless local area network frequency band from the diversity receiver module; and
a transceiver coupled to the diversity receiver module and to the wireless local area network module, the transceiver configured to receive processed signals within the cellular frequency band from the diversity receiver module and to receive processed signals within the wireless local area network frequency band from the wireless local area network module.

15. The wireless device of claim 14 wherein the diversity receiver module is configured to concurrently process cellular signals and wireless local area network signals without the use of cascaded filters.

16. The wireless device of claim 14 wherein the antenna multiplexer is a triplexer that is configured to provide signals in a second frequency range along a second signal path and to provide signals in a third frequency range along a third signal path, the second frequency range including a second cellular frequency band and a second wireless local area network frequency band, and the third frequency range including a third cellular frequency band and a fourth cellular frequency band.

17. The wireless device of claim 16 wherein the diversity receiver module further includes a second switching network configured to receive the signals in the second frequency range and to direct signals within the second cellular frequency band along a third output path and to simultaneously direct signals within the second wireless local area network frequency band along a fourth output path.

18. The wireless device of claim 17 wherein the fourth output path is coupled to the wireless local area network module.

19. The wireless device of claim 17 wherein the diversity receiver module further includes a third switching network configured to receive the signals in the third frequency range and to direct signals within the third cellular frequency band along a fifth output path and to direct signals within the fourth cellular frequency band along a sixth output path.

20. The wireless device of claim 19 wherein the first frequency range includes mid-band and high-band cellular frequency bands, the second frequency range includes ultra-high-band cellular frequency bands, and the third frequency range includes low-band cellular frequency bands.

* * * * *